US008872836B2

(12) United States Patent
Rabii

(10) Patent No.: US 8,872,836 B2
(45) Date of Patent: Oct. 28, 2014

(54) DETECTING STATIC IMAGES AND REDUCING RESOURCE USAGE ON AN ELECTRONIC DEVICE

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 13/013,606

(22) Filed: Jan. 25, 2011

(65) Prior Publication Data

US 2012/0188262 A1 Jul. 26, 2012

(51) Int. Cl.
*G06T 1/60* (2006.01)
*G06F 13/372* (2006.01)
*G09G 5/393* (2006.01)

(52) U.S. Cl.
CPC .......... *G09G 5/393* (2013.01); *G09G 2330/021* (2013.01); *G09G 2330/022* (2013.01); *G09G 2320/103* (2013.01)
USPC .......................................... 345/530; 345/534

(58) Field of Classification Search
CPC ..... G06F 1/3265; G06F 1/324; G06F 1/3275; G06F 1/3203
USPC ................................................. 345/530, 534
See application file for complete search history.

(56) References Cited

U.S. PATENT DOCUMENTS

| | | | | |
|---|---|---|---|---|
| 5,576,738 | A | 11/1996 | Anwyl et al. | |
| 5,907,330 | A | 5/1999 | Simmers | |
| 5,961,617 | A | 10/1999 | Tsang | |
| 6,657,634 | B1 | 12/2003 | Sinclair et al. | |
| 6,816,138 | B2 | 11/2004 | Huang et al. | |
| 6,909,434 | B2 | 6/2005 | Takala et al. | |
| 7,017,053 | B2 | 3/2006 | Mizuyabu et al. | |
| 7,714,831 | B2 * | 5/2010 | Plut | 345/102 |
| 2008/0100636 | A1 | 5/2008 | Lai et al. | |
| 2008/0143695 | A1 * | 6/2008 | Juenemann et al. | 345/204 |

FOREIGN PATENT DOCUMENTS

| | | | |
|---|---|---|---|
| JP | H0535195 | A | 2/1993 |
| JP | 2000259140 | A | 9/2000 |
| JP | 2004151222 | A | 5/2004 |
| JP | 2006013913 | A | 1/2006 |

OTHER PUBLICATIONS

International Search Report and Written Opinion—PCT/US2012/021353—ISA/EPO—Apr. 18, 2012.

* cited by examiner

*Primary Examiner* — Hau Nguyen
(74) *Attorney, Agent, or Firm* — Campbell Chiang; James R. Gambale, Jr.

(57) ABSTRACT

An electronic device for detecting static images and reducing resource usage is described. The electronic device includes a processor and instructions stored in memory. The electronic device determines image memory. The electronic device also sets a timer. The electronic device further monitors the image memory. The electronic device also determines whether there is a write access request for the image memory. Furthermore, the electronic device determines whether a time threshold has been reached based on the timer if there is not a write access request for the image memory. The electronic device also reduces display resource usage if the time threshold has been reached.

24 Claims, 10 Drawing Sheets

DETECTING STATIC IMAGES AND REDUCING RESOURCE USAGE ON AN ELECTRONIC DEVICE

TECHNICAL FIELD

The present disclosure relates generally to electronic devices. More specifically, the present disclosure relates to detecting static images and reducing resource usage on an electronic device.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices include or use a display for displaying images. For example, computers often use a monitor to display images. Cellular phones and smart phones often use a display panel such as a Liquid Crystal Display (LCD) or an Active Matrix Organic Light Emitting Diode (AMOLED) display. Other electronic devices that include or use a display include televisions, projectors, calculators, music players (e.g., iPods, etc.), Personal Digital Assistants (PDAs), Global Positioning System (GPS) devices, tablet devices, laptop computers, e-readers, etc.

The displays used in electronic devices consume electrical power. For example, the displays may use electrical power to illuminate pixels on a display, refresh the display and/or change the display contents. Furthermore, electrical power is also consumed in processing images for presentation on a display. As can be observed from this discussion, systems and methods that improve the efficiency of electronic devices that use displays may be beneficial.

SUMMARY

An electronic device for detecting static images and reducing resource usage is disclosed. The electronic device includes a processor and instructions stored in memory. The electronic device determines image memory. The electronic device also sets a timer. The electronic device further monitors the image memory. The electronic device also determines whether there is a write access request for the image memory. Furthermore, the electronic device determines whether a time threshold has been reached based on the timer if there is not a write access request for the image memory. The electronic device also reduces display resource usage if the time threshold has been reached. The electronic device may include a display. The electronic device may also reset the timer if there is a write access request for the image memory.

Reducing display resource usage includes reducing display contrast, reducing display brightness, reducing a display refresh rate, reducing clocking, reducing image processing, reducing decoding, adjusting bus priorities, adjusting bus speed, adjusting a display interface or adjusting a voltage. The contrast may be reduced based on an image dynamic range. The electronic device may also reduce image memory usage if the time threshold has been reached. The electronic device may also adjust display resource usage if there is a write access request for the image memory after reducing display resource usage.

Monitoring the image memory may include monitoring addresses in the memory that are used for displaying one or more images on a display. The image memory may include one or more memory buffers in a display controller.

If there is a write access request for the image memory, the electronic device may also determine whether an image change threshold is reached based on the write access request. If there is a write access request, the electronic device may also determine whether the time threshold has been reached based on the timer if the image change threshold has not been reached. The electronic device may reduce display resource usage if the time threshold has been reached.

A method for detecting static images and reducing resource usage is also disclosed. The method includes determining image memory on an electronic device. The method also includes setting a timer. The method further includes monitoring the image memory. The method also includes determining, on the electronic device, whether there is a write access request for the image memory. The method also includes determining whether a time threshold has been reached based on the timer if there is not a write access request for the image memory. Furthermore, the method includes reducing, on the electronic device, display resource usage if the time threshold has been reached.

A computer-program product for detecting static images and reducing resource usage is also disclosed. The computer-program product includes a non-transitory tangible computer-readable medium with instructions. The instructions include code for causing an electronic device to determine image memory. The instructions also include code for causing the electronic device to set a timer. The instructions further include code for causing the electronic device to monitor the image memory. The instructions also include code for causing the electronic device to determine whether there is a write access request for the image memory. Furthermore, the instructions include code for causing the electronic device to determine whether a time threshold has been reached based on the timer if there is not a write access request for the image memory. Additionally, the instructions include code for causing the electronic device to reduce display resource usage if the time threshold has been reached.

An apparatus for detecting static images and reducing resource usage is also disclosed. The apparatus includes means for determining image memory. The apparatus also includes means for setting a timer. The apparatus further includes means for monitoring the image memory. The apparatus also includes means for determining whether there is a write access request for the image memory. Furthermore, the apparatus includes means for determining whether a time threshold has been reached based on the timer if there is not a write access request for the image memory. The apparatus additionally includes means for reducing display resource usage if the time threshold has been reached.

DETAILED DESCRIPTION

Figure 1:
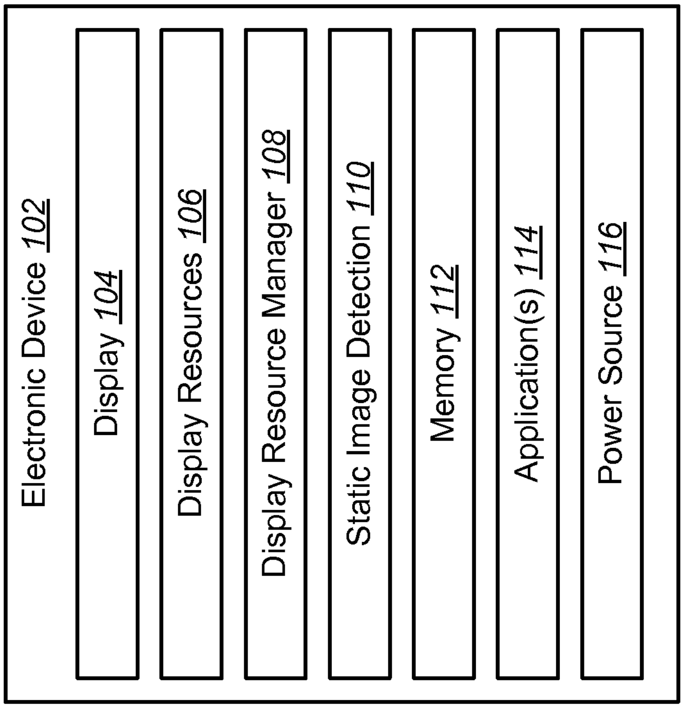
FIG. 1 is a block diagram illustrating one configuration of an electronic device in which systems and methods for detecting static images and reducing resource usage may be implemented.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as the Institute of Electrical and Electronics Engineers (IEEE) 802.11a, 802.11b, 802.11g, 802.11n, 802.11ac (e.g., Wireless Fidelity or "Wi-Fi") standards. Other examples of standards that a base station may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a kind of electronic device (e.g., access terminal, client device, client station, etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

Presenting dynamic images (e.g., images that are changing) may require a display (e.g., display panel) to be refreshed at high refresh rates to remedy poor response or to overcome flicker. However, when presenting static images (e.g., unchanging images such as a constant user interface (UI) screen, paused file playback or video decoding, a still photo review or a still-scene camera view finder), the display (e.g., display panel) may be updated at substantially lower refresh rates, which may significantly benefit platform power performance. Nevertheless, identifying when displayed content has not changed may be complicated. For example, typical High-Level Output Specifications (HLOS) like Windows Mobile or Android do not support a framework for controlled access of a display buffer, which enables ad-hoc display composition. Furthermore, controlling access from a display driver may yield execution exceptions and system crashes.

Depending on the display type, the required refresh rate for displaying dynamic images or pixels may vary from the original content frame-rate (e.g., 5-10 frames/second) to a multiple of this rate. Liquid Crystal Displays (LCDs) may use a separate backlight to illuminate the image samples controlled by liquid crystal shutter opacity. Since these shutters may maintain opacity until instructed otherwise, many LCDs used in portable devices need continuous refreshing and other gimmicks to enable transparency required to display live video. Because of an Organic Light Emitting Diode (OLED) pixel's quick response (e.g., unlike LCDs), an OLED display may not need to refresh its pixels at high rates or use other means to enhance its response time. However, it may still need to refresh the image content at a high refresh rate to overcome flicker. Although presenting dynamic images (e.g., changing images or live pictures) requires that a display panel be refreshed at high refresh rates to remedy poor response or to overcome flicker, when presenting static images (e.g., static pictures), the panel may be updated at substantially lower refresh rates, which may benefit platform power performance. It should be noted that the term "refresh rate" as used herein may denote refresh rate, scan rate, update rate and/or frame rate.

As discussed above, identifying when display content has not changed may be complicated. Hence, the display memory space may be marked and write access to modify its content may be identified. Even in implementations with memory virtualization, (e.g., similar to provisions for memory protection) any accesses to modify a display frame buffer may be required to signal the start of a dynamic image interval to a display processor. This mechanism may further be used to facilitate transitions to various modes of operation that are based on static image duration such as reduced contrast ratio and ultimately muting the display. The systems and methods disclosed herein may also be applied to technologies that allow finer granularity of controlling access to a display buffer and display interfaces that may enable arbitrary access to display partitions, which may be used to selectively update only the portion of a display that is modified.

There may be several instances when an electronic device displays a static or unchanging image. This may occur, for example, when the electronic device (e.g., processor and/or graphics processor) renders a constant surface with unchanged blending or keying (e.g., with an unchanged user interface (UI) or Global Positioning System (GPS) screen or as referenced by an application or map, etc.). This may also occur when file playback (e.g., video decoding) is paused, when streaming video (e.g., web television, Mobile Broadcast Services Enabler Suite (BCAST) TV) is suffering network interruptions or is rendering still video for music television programs, when a snapshot (e.g., digital photograph) is being reviewed or when a camera or camcorder captures (and the viewfinder displays) a constant scene.

The systems and methods disclosed herein may be used to enhance the power performance of an electronic device. For example, the systems and methods disclosed herein may be used to perform demand paging of a display buffer, thus reducing page faults (e.g., Synchronous Dynamic Random Access Memory (SDRAM) page faults) or increasing the use of available on-chip memory. For instance, the power performance of on-chip memory may be about ten times lower than a best case performance for "external" memory (e.g., memory other than on-chip memory, which may be internal to and/or external to an electronic device). More specifically, power performance slopes (in milliwatts (mW) per megabytes per second (MBpS) or mW/MBpS, for example) may indicate that higher page faults lead to higher power consumption (for Double Data Rate (DDR) memory, for example). Thus, reducing page faults may reduce power consumption (and/or increase power performance).

When a static image is detected, for instance, a backlight in an LCD display panel may be reduced (based on the contrast requirements for the image, for example). Furthermore, this detection may be used to reduce a refresh rate, which may be beneficial for LCDs (by providing a ten-to-one reduction, for example). Also, when a display panel controller is integrated into a multimedia processor, the systems and methods disclosed herein may allow a display refresh to be extended beyond a blanking interval. This may reduce platform resource (e.g., clocks and voltages) usage (to a low or lowest possible threshold, for example). Furthermore, the detection of static images may be used for transitioning to other display modes, such as reduced contrast ratio and a "muted" display. The systems and methods disclosed herein may also be used to avoid burn-in or image sticking for prolonged static images and to extend panel life.

In one approach, a static image may be detected using a hardware capability that marks a display memory space (e.g., "image memory") such as pages, segments or surfaces to identify when any requester alters the display content. This may be different from other approaches, such as using an application processor (AP) suspend-and-wait-for-interrupt (SWFI) to identify when no requester may alter display content. For instance, application processor (AP) suspend-and-wait-for-interrupt (SWFI) signaling may be used for static image resource control or for static image power performance. However, the systems and methods disclosed herein use memory accesses to identify whether the display content remains unchanged. This is because other approaches (including using an application processor's SWFI) may be unreliable and/or may not be as accurate.

Some display performance attributes may include dark screen or blackness, warm-up time, intensity and grayscale (e.g., intrinsic and extrinsic luminance, contrast ratio and detail-contrast ratio), center-screen luminance, screen uniformity (e.g., luminance and contrast ratio uniformity), color scales and/or color gamut, correlated color temperature, color uniformity, spatiotemporal display blur width (BW), response time, flicker, fill factor (e.g., active area versus dedicated real estate), screen fill factor (e.g., scaling and rotation), viewing angle, color versus viewing angle, shadowing (e.g., cross talk), streaking and ghosting, reflection, gamma, and image retention. Some of these performance attributes may be influenced by power performance adjustment (e.g., optimization). These may include warm-up time, intensity and grayscale (e.g., intrinsic and extrinsic luminance, contrast ratio and detail-contrast ratio), screen uniformity (e.g., luminance and contrast ratio uniformity), color scales and/or color gamut, correlated color temperature, response time, flicker, screen fill factor (e.g., scaling and rotation), viewing angle, color versus viewing angle, streaking and ghosting and gamma.

Some display-device performance contexts may include user-directed manipulation (e.g., visual preferences and battery life annotation), use-case requirements, battery life and its instantaneous performance (this may be because of display device workload variability and due to the variability of load unrelated to the display device, for example), content (e.g., content type such as the number of display surfaces, synthetic/real, need for color conversion, static images, dynamic images and screen fullness and static images) and use-environment (e.g., user human visual system (HVS) relationship with the display and ambient lighting conditions). These contexts may be used to adjust the hysteresis for transitioning into a static image mode. For instance, one or more of these contexts may be used to adjust a time threshold before transitioning into a static image mode. For instance, dark ambient lighting conditions may lower the time threshold. Furthermore, a user preference setting may raise the time threshold. The systems and methods disclosed herein may be particularly concerned with detecting static images. Detecting static images may be enabled or controlled in the context of use-case requirements and content, thus possibly involving use-case registration (e.g., annunciation and arbitration) and image processing. One display performance attribute that may be affected by reducing power consumption based on static images may be noticeable visual artifacts.

Some contexts that may be used to improve display power performance may include content-based adaptive brightness control, light-based adaptive brightness control, light-based adaptive contrast ratio, adaptation of brightness and contrast ratio to a use-case, adaptation of display refresh rate to a use-case and content, partial-screen update, screen fullness, user annotation for display device control, battery life status for display device control and platform resource scaling per display mode (e.g., static image display mode). These contexts may be used in conjunction with or independently from reducing display resource usage using static image detection.

Static image detection may use a robust mechanism to identify when all surfaces contributing to final composition (e.g., image) are unchanged. Static image detection may offer two types of benefits, including power performance enhancements gained from down-scaling platform resources and enhancements resulting from operating the display panel with a lower performance profile.

When a static image occurs, a display (e.g., panel) may present the content with a lower contrast ratio and a reduced refresh rate (e.g., low refresh rate to no refresh, which may depend on the type of display). Depending on latency for up-scaling resources and in order to avoid an objectionable user interface (UI) quality of experience (QoE or user experience (UX)), a static image mode may be interrupted by any change in system status, which may reduce its benefits. Beyond power for display illumination, static image detection implementation may depend on whether a panel controller is equipped with a display buffer and pixel clock generator. This may be taken into consideration for typical smartphone or smartpad implementations where the panel is active (e.g., not bistable). However, it should be noted that the systems and methods disclosed herein may also be applied to bistable displays. In implementations with a panel controller that has display buffer, a host multimedia processor may identify static images and transition to dormancy. In this case, the panel controller may determine static image detection power performance.

It should be noted that with an ever-increasing display size, for scalability and cost benefits, many electronic device (e.g., handset) designers may favor using host multimedia processor memory, which may require the multimedia platform to mimic panel controller static image detection or operation. With transitions into and out of a static image mode, the multimedia platform may be required to frequently scale resources (e.g., clocks, voltages and interface priorities, etc.) to improve its power performance. Because of inherent interdependency among various subsystem clocks, latency of voltage control and overhead for changing interface priorities, achieving acceptable static image power performance has been difficult in the past.

Some points on scaling resources in a 7×30 platform are given hereafter. In the 7×30 platform, a long application processor (AP) suspend-and-wait-for-interrupt (SWFI) is one mechanism or approach to identify static images. Because of latency for exiting static image mode and potential start-up issues, a registration mechanism to disable static image mode may also be available. Latency for exiting static image mode may be desirably reduced. The latency for clock and voltage scaling in particular electronic devices may be characterized. The possibility and overhead for reconfiguring interface priority in static image mode may be studied.

It should be noted that due to interdependency among clocks, scaling clocks may create choke-points in display data flow and result in noticeable artifacts. Thus, static image mode may be easier to implement when all clocks (e.g., clocks for Advanced Extensible Interface (AXI), memory controller, and Mobile Display Digital Interface (MDDI)) are sourced from a single Phase-Locked-Loop (PLL).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for detecting static images and reducing resource usage may be implemented. Examples of the electronic device 102 include smartphones, cellular phones, Personal Digital Assistants (PDAs), music players (e.g., iPods, Moving Picture Experts Group (MPEG)-1 or MPEG-2 Audio Layer 3 (MP3) players, etc.), laptop computers, desktop computers, projectors, video game systems, televisions, portable Digital Video Disc (DVD) players and other electronic devices. The electronic device 102 includes a display 104, display resources 106, a display resource manager 108, a static image detection block and/or module 110, memory 112, one or more applications 114 and a power source 116.

The display 104 may be a device that conveys visual information. Examples of a display 104 include a Liquid Crystal Display (LCD), an Organic Light Emitting Diode (OLED) display, an Active Matrix Organic Light Emitting Diode (AMOLED) display, a Digital Light Processing (DLP) display, plasma display, Cathode Ray Tube (CRT) display, etc. More general examples of the display 104 include a computer monitor, a projector, a television display, a touch screen, etc. The display 104 may be used to display images, such as changing images and unchanging (e.g., static or stationary) images. The electronic device 102 may also include (not shown) additional blocks or modules used to operate the display 104, such as a display controller and a display driver.

The display resources 106 may include resources that are used to operate the display 104 or resources that characterize the operation of the display 104. Examples of display resources 106 include contrast ratio (CR), brightness, refresh rate, image processing, decoding (e.g., video decoding) and clocking Each of these display resources 106 may affect the operation of the display 104. For example, the contrast ratio may control or determine the amount of contrast in an image produced by the display 104. The brightness may control or determine the amount of light emitted by the display 104. The refresh rate may control or determine how often the display (or the image on the display) 104 is refreshed (e.g., how often another frame of pixels is output). Image processing may be used to perform processing on an image to be displayed. Examples of image processing include overlay processing, scaling and rotation, etc. of an image. Decoding may be used to decode images for display. For example, a video file or stream may need to be decoded before presentation on the display 104. Clocking may determine the frequency or speed at which components used for operating the display 104 may run. For instance, the clocking may be adjusted to vary the frequency at which image processing computations occur, at which image memory is updated and/or at which a bus operates.

The display resource manager 108 is a block and/or module used to control the display resources 106. For example, the display resource manager 108 may control the contrast ratio, brightness, refresh rate, image processing, decoding and/or clocking used to present an image. In one configuration, the display resource manager 108 controls the display resources 106 based on whether or not a static image is presented on the display 104. For example, the static image detection block and/or module 110 indicates whether a static image is being presented on the display 104 to the display resource manager 108. The display resource manager 108 may adjust one or more of the display resources 106 based on this indication. For example, the display resource manager 108 reduces the contrast ratio, brightness, refresh rate, image processing, decoding and/or clocking when the display 104 is presenting a static image. In one configuration, the display resource manager 108 also adjusts the display resources 106 based on the image that is being presented. For example, the display resource manager 108 may reduce the contrast ratio based on the dynamic range (e.g., luminance range) of the image being presented on the display 104.

The static image detection block and/or module 110 detects whether a static (e.g., unchanging) image is presented on the display 104. In one configuration, the static image detection block and/or module 110 detects whether a static image is being presented by monitoring the memory 112. For example, it 110 monitors the memory 112 (or portions of memory 112) to determine whether there is a write access request for memory 112 that is being used to present an image. For instance, it 110 sets a timer and monitors the memory 112 for write access requests corresponding to memory addresses used for presenting the image on the display 104. If no such write access request occurs for an amount of time (where a time limit or time threshold is met or exceeded, for example), then the static image detection block and/or module 110 indicates that a static image is displayed to the display resource manager 108. However, if a write access request for the relevant memory occurs, it 110 resets the timer. It should be noted that the memory 112 is a device that stores information or data (e.g., Random Access Memory (RAM), Dynamic Random Access Memory (DRAM), Synchronous DRAM (SDRAM), Double-Data-Rate (DDR) RAM, etc.). The memory 112 may be separate from other components of the electronic device 102 and/or may be incorporated into a component (e.g., display controller, processor, etc.).

In one configuration, the static image detection block and/or module 110 may detect a degree of change and still deem the image static. For example, if only a small amount of memory 112 has changed (e.g., representing a small portion of the display 104), the static image detection block and/or module 110 may deem the image to be static. This may be useful in cases where the image is minimally changing, such as when an audio player program is displaying a slider that minimally moves as a song is being played. For example, this may occur in a scenario when one or more applications use one or more small annunciators to signal some status change which may not be inherently in the best interest of user and quality of experience when considering battery life. The degree to which an image is unchanging that triggers a static image indication may differ according to the configuration.

A notion that a "system must think smarter than an application" may become increasingly important as cloud-based user interfaces become more prevalent. This is because technologies that demand battery currently are emerging at a much faster pace and are expected to frustrate battery technology "snail-pace" evolution.

The one or more applications 114 are software or programs. Examples of applications 114 include photo viewing applications, video games, productivity software (e.g., word processors, spreadsheet software, presentation software, database management software, etc.) and multimedia players, etc. In some configurations, the one or more applications 114 generate images (e.g., user interfaces (UIs), pictures, icons, video, still pictures, etc.) for presentation on the display 104. For example, an application 114 produces write access memory requests to access the memory 112 in order to produce changing or unchanging images on the display 104.

The power source 116 provides electrical power or energy to the electronic device 102. Examples of power sources 116 include batteries, power interfaces (for a wall plug, for example) or other power sources (e.g., solar panels, generators, etc.). In general, the electronic device 102 consumes power from the power source 116 to operate. The amount of power consumed depends on the display resources 106 used to present an image on the display 104. For example, the higher the contrast ratio, brightness, refresh rate, amount of image processing, clocking frequency and amount of decoding performed by the electronic device 102, the larger the power consumption. Assuming that the power source 116 is a battery, for instance, the more display resources 106 used, the faster the battery discharges. In one configuration, the electronic device 102 conserves its power source 116 by reducing the amount of display resources 106 used when a static image is being presented on the display 104.

Figure 2:
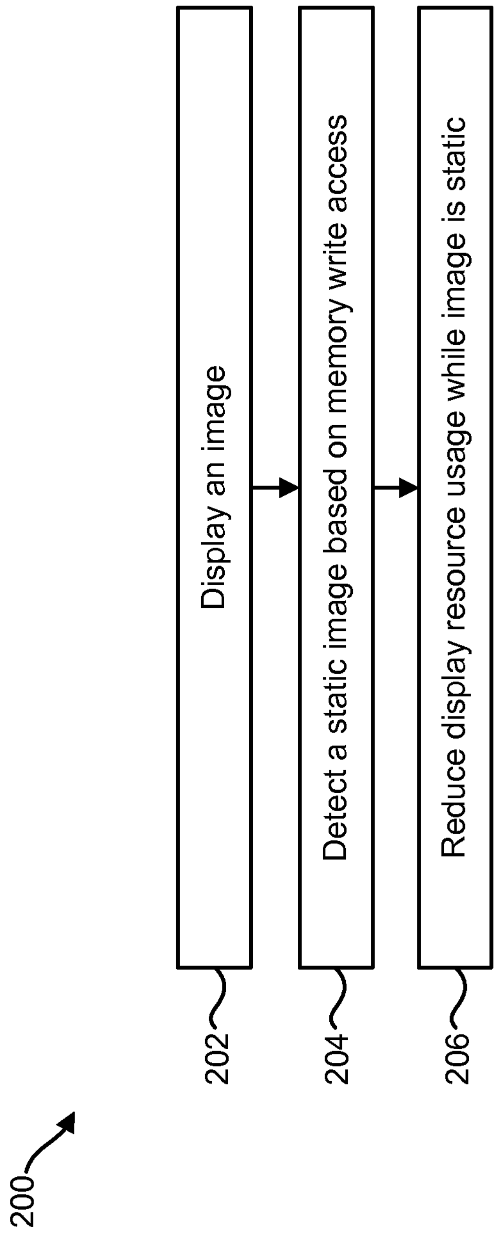
FIG. 2 is a flow diagram illustrating one configuration of a method for detecting static images and reducing resource usage on an electronic device.

FIG. 2 is a flow diagram illustrating one configuration of a method 200 for detecting static images and reducing resource usage on an electronic device 102. An electronic device 102 may display 202 an image. For example, the electronic device 102 uses information or data in the memory 112 to display or present 202 an image on a display 104.

The electronic device 102 may detect 204 a static image based on memory write access. For example, the electronic device 102 monitors the memory 112 to determine whether an application 114, processor or other software or hardware is requesting access to write information or data to a portion of the memory 112 used for presenting an image on the display 104. If write access to the memory 112 (e.g., for image presentation) has not occurred within an amount of time, the electronic device 102 may detect a static image (or deem that an image being displayed is static). For example, the electronic device 102 may use a timer and a time threshold (e.g., 100 milliseconds (ms)) to determine if write access to "image memory" has not been requested within a particular amount of time. In one configuration, the electronic device 102 starts or sets the timer. If a write access request for "image memory" occurs before the time threshold is reached, the electronic device 102 resets the timer. However, if the time threshold is reached without such a write access request, the electronic device 102 detects a static image or deems the image as static.

If the electronic device 102 detects 204 a static image, it 102 reduces 206 display resource usage while the image is static. As noted above, examples of display resources 106 include contrast (ratio), brightness, refresh rate, image processing, decoding and/or clocking. The electronic device 102 may reduce 206 one or more display resources while the image is static. For example, the electronic device 102 reduces the contrast ratio (optionally based on an image's dynamic range), brightness, refresh rate, image processing, decoding and/or clocking Reducing 206 display resource usage may conserve energy (e.g., electrical power provided by the power source 116). Furthermore, this may lengthen the life of the display 104.

Figure 3:
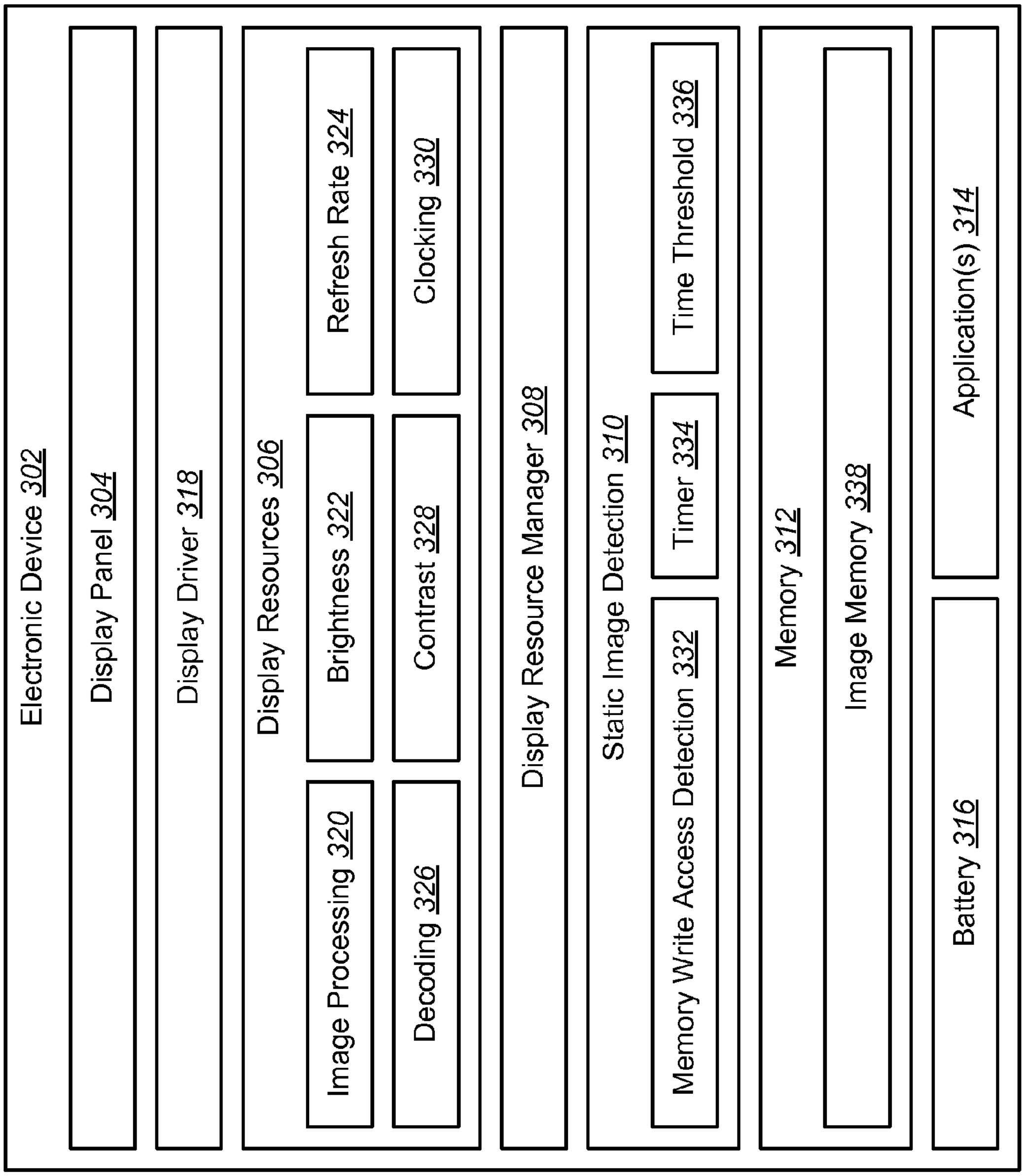
FIG. 3 is a block diagram illustrating a more specific configuration of an electronic device in which systems and methods for detecting static images and reducing resource usage may be implemented.

FIG. 3 is a block diagram illustrating a more specific configuration of an electronic device 302 in which systems and methods for detecting static images and reducing resource usage may be implemented. The electronic device 302 includes a display panel 304, display driver 318, display resources 306, a display resource manager 308, a static image detection block and/or module 310, memory 312, one or more applications 314 and a battery 316.

The display panel 304 may be a device that conveys visual information. Examples of a display panel 304 include a Liquid Crystal Display (LCD), an Organic Light Emitting Diode (OLED) display, an Active Matrix Organic Light Emitting Diode (AMOLED) display, a Digital Light Processing (DLP) display, plasma display, etc. More general examples of the display panel 304 include a computer monitor, a projector, a television display, a touch screen, etc. The display panel 304 may be used to display images, such as changing images and unchanging (e.g., static or stationary) images.

The display driver 318 is a module that the electronic device 302 uses to operate its display panel 304. One example of a display driver 318 is a software module that interfaces the display panel 304 with other components (e.g., software and/or hardware) of the electronic device 302. For instance, an application 314 may use the display driver 318 to display an image on the display panel 304. More specifically, a display driver 318 may translate instructions and/or information from an application 314 or operating system into instructions and/or information for the display panel 304. In one configuration, the display driver 318 may manage memory used for image information. In some configurations, a display controller (not shown) is also included on the electronic device 302.

The display resources 306 may include resources that are used to operate the display panel 304 or resources that characterize the operation of the display panel 304. In the configuration illustrated in FIG. 3, the display resources 306 include contrast (ratio) 328, brightness 322, refresh rate 324, image processing 320, decoding (e.g., video decoding) 326 and clocking 330. Each of these display resources 306 may affect the operation of the display panel 304. For example, the contrast ratio 328 may control or determine the amount of contrast in an image produced by the display panel 304. The brightness 322 may control or determine the amount of light emitted by the display panel 304. The refresh rate 324 may control or determine how often the display panel 304 is refreshed (e.g., how often another frame of pixels is output). Image processing 320 may be used to perform processing on an image to be displayed. Examples of image processing 320 include overlay processing, scaling and rotation, etc. of an image. Decoding 326 may be used to decode images for display. For example, a video file or stream may need to be decoded before presentation on the display panel 304. Clocking 330 may determine the frequency or speed at which components used for operating the display panel 304 or generating images may run. For instance, the clocking 330 may be adjusted to vary the frequency at which image processing computations occur, at which image memory is updated and/or at which a bus operates.

The display resource manager 308 is a block and/or module used to control the display resources 306. For example, the display resource manager 308 may control the contrast ratio 328, brightness 322, refresh rate 324, image processing 320, decoding 326 and/or clocking 330 used to present an image. In one configuration, the display resource manager 308 controls the display resources 306 based on whether or not a static image is presented on the display panel 304. For example, the static image detection block and/or module 310 indicates whether a static image is being presented on the display panel 304 to the display resource manager 308. The display resource manager 308 may adjust one or more of the display resources 306 based on this indication. For example, the display resource manager 308 reduces the contrast ratio 328, brightness 322, refresh rate 324, image processing 320, decoding 326 and/or clocking 330 when the display panel 304 is presenting a static image. In one configuration, the display resource manager 308 also adjusts the display resources 306 based on the image that is being presented. For example, the display resource manager 308 may reduce the contrast ratio 328 based on the dynamic range (e.g., luminance range) of the image being presented on the display panel 304.

The static image detection block and/or module 310 detects whether a static (e.g., unchanging) image is presented on the display panel 304. In one configuration, the static image detection block and/or module 310 includes a memory write access detection block and/or module 332, a timer 334 and/or a time threshold 336. In one configuration, the memory write access detection block and/or module 332 detects whether a static image is being presented by monitoring the memory 312. For example, it 332 monitors the image memory 338 (within the memory 312, for example) to determine whether there is a write access request for the image memory 338 that is being used to present an image. For instance, the static image detection block and/or module 310 sets the timer 334 and monitors the image memory 338 for write access requests corresponding to memory addresses used for presenting the image on the display panel 304. If no such write access request occurs for an amount of time (where a time limit or time threshold 336 is met or exceeded, for example), then the static image detection block and/or module 310 indicates that a static image is displayed to the display resource manager 308. However, if a write access request for the image memory 338 occurs, it 310 resets the timer 334.

It should be noted that the time threshold 336 may be adjustable based on factors such as settings, contexts and/or current performance. For example, the time threshold 336 may be adjusted based on user-directed manipulation (e.g., visual preferences and battery life annotation), use-case requirements, battery life and its instantaneous performance (this may be because of display device workload variability and due to the variability of load unrelated to the display device, for example), content (e.g., content type such as the number of display surfaces, synthetic/real, need for color conversion, static images, dynamic images and screen fullness and static images) and use environment (e.g., user human visual system (HVS) relationship with the display and ambient lighting conditions). In other words factors may be used to adjust the hysteresis for transitioning into a static image mode. For instance, one or more of these factors may be used to adjust a time threshold 336 before transitioning into a static image mode. For instance, dark ambient lighting conditions may lower the time threshold 336. Furthermore, a user preference setting may raise the time threshold 336.

The memory 312 may include image memory 338. Image memory 338 may be memory that is allocated for the display or presentation of images. The memory 312 (e.g., image memory 338) may be separate from other components of the electronic device 302 and/or may be incorporated into a component (e.g., display controller, processor, etc.).

The one or more applications 314 are software or programs. Examples of applications 314 include photo viewing applications, video games, productivity software (e.g., word processors, spreadsheet software, presentation software, database management software, etc.) and multimedia players, etc. In some configurations, the one or more applications 314 generate images (e.g., user interfaces (UIs), pictures, icons, video, still pictures, etc.) for presentation on the display panel 304. For example, an application 314 produces write access memory requests to access the image memory 338 in order to produce changing or unchanging images on the display panel 304.

The battery 316 provides electrical power or energy to the electronic device 302. One example of the battery 316 is a lithium-ion battery. In general, the electronic device 302 consumes power from the battery 316 to operate. The amount of power consumed depends on the display resources 306 used to present an image on the display panel 304. For example, the higher the contrast ratio 328, brightness 322, refresh rate 324, amount of image processing 320, clocking frequency 330 and amount of decoding 326 performed by the electronic device 302, the larger the power consumption. In general, as more display resources 306 are used, the faster the battery 316 discharges. In one configuration, the electronic device 302 conserves its battery 316 power by reducing the amount of display resources 306 used when a static image is being presented on the display panel 304.

Figure 4:
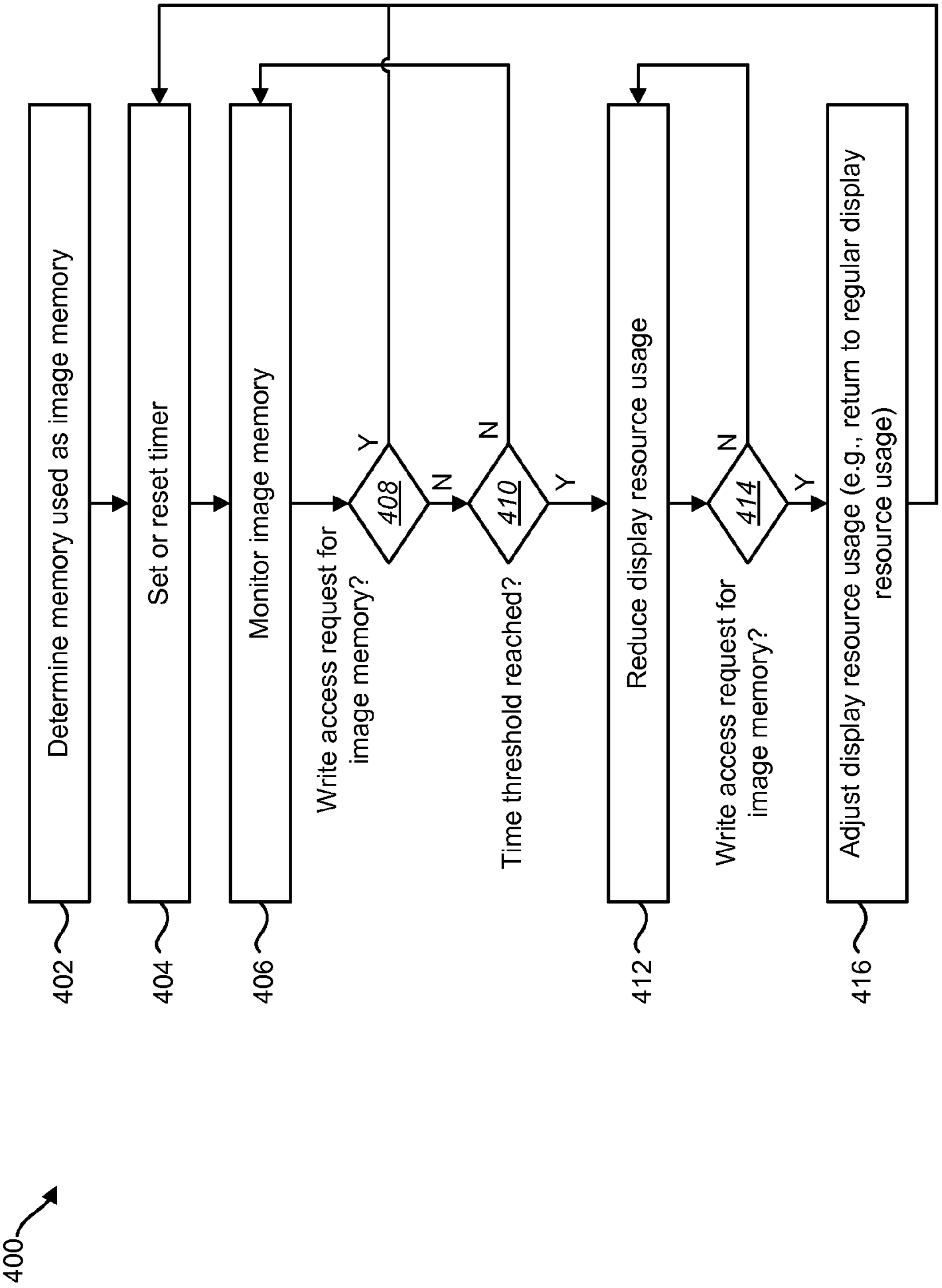
FIG. 4 is a flow diagram illustrating a more specific configuration of a method for detecting static images and reducing resource usage on an electronic device.

FIG. 4 is a flow diagram illustrating a more specific configuration of a method 400 for detecting static images and reducing resource usage on an electronic device 302. An electronic device 302 may determine 402 memory used as image memory 338. In one configuration, when a component (e.g., application 314, graphics processor, etc.) attempts to present an image on the display panel 304, the display driver 318 provides an address, pointer or range of addresses or pointers corresponding to memory 312 (e.g., a buffer) where image information or data may be written. The static image detection block and/or module 310 may track addresses, pointers or ranges thereof (from the display driver 318, for example) to distinguish image memory 338 from other portions of memory 312. In other words, memory 312 at the addresses, pointers or ranges thereof that are used for presenting images may be designated as image memory 338, while other portions of memory 312 may not be.

The electronic device 302 may set or reset 404 a timer 334. The timer 334 provides an amount of time from when it 334 was set or reset 404. The timer 334 may be based on a clock signal produced by a clock generator. In one configuration, the electronic device 302 includes an integrated circuit that produces a clock signal. More specifically, when the electronic device 302 sets or resets 404 the timer 334, the timer 334 begins to track time from the instant or moment it was set or reset 404, for example.

The electronic device 302 monitors 406 image memory 338 to determine whether a component (e.g., an application 314, processor or other software or hardware) is requesting access to write information or data to the image memory 338. For example, the electronic device 302 monitors write access requests that correspond to a particular memory address, pointer or range thereof used for presenting images. The electronic device 302 determines 408 whether a write access request for image memory 338 has occurred. For example, the memory write access detection block and/or module 332 detects or is notified when a write access request corresponding to the image memory 338 has occurred. If a write access request for image memory 338 has occurred, the electronic device 302 resets 404 the timer 334.

In an alternative configuration, if one or more write access requests for image memory 338 has occurred, the electronic device 302 may determine whether a threshold amount of image change has occurred or will occur from the one or more write access requests for image memory 338. This may be done instead of directly proceeding to reset 404 the timer 334 if a write access request has occurred, for example. For example, the electronic device 302 may determine whether at least a threshold amount of a displayed image is changing. For instance, if only a particular (e.g., small) amount of image memory 338 is changing or if one or more write access requests only change the displayed image less than a particular degree, the threshold may not be reached (e.g., met or exceeded). However, if one or more write access requests for image memory 338 have or will change the displayed image more than that degree, then the threshold may be met or exceeded. This threshold may be referred to as an "image change" threshold. If the image change threshold is reached (e.g., met or exceeded), then the electronic device 302 may proceed to reset 404 the timer 334. However, if the image change threshold is not met or exceeded, then the electronic device 302 may proceed to determine 410 whether a time threshold 336 has be reached or exceeded.

This alternative approach may be useful in cases where an image is minimally changing (e.g., a slow moving slider proceeds as a song is being played, the image color is slowly changing, the displayed image is moving very slowly, etc.). Thus, in this alternative configuration, one or more memory write access requests may be made, but if they only change a minor portion or component of the displayed image, then a static image mode may still be triggered (e.g., resource display usage may still be reduced 412 if a time threshold is reached). The image change threshold may be based on one or more factors. Examples of factors include the amount of memory (e.g., number and/or range size of addresses) being changed or access being requested, the number and/or range size of corresponding pixels being changed and/or the difference in luminance, color, etc. between the prior and next image data (e.g., in a Red-Green-Blue (RGB) color scale), etc.

If a write access request for image memory 338 has not occurred (or alternatively, if a write access request for image memory 338 has occurred but the image change threshold has not be met or exceeded), the electronic device 302 determines 410 whether a time threshold 336 has been reached or exceeded. For example, the electronic device 302 may make this determination 410 as illustrated in Equation (1).

$$\text{Timer} \geq \text{Threshold} \quad (1)$$

In Equation (1), Timer is the amount of time represented by the timer 334 and Threshold is the threshold 336 amount (in time). For example, the time threshold 336 may be 100 ms. It should be noted that an image that has remained unchanged for at least the time threshold 336 amount of time may be deemed a "static" image. If the time threshold 336 has not been reached or exceeded, the electronic device 302 continues monitoring 406 image memory 338.

If the time threshold 336 has been reached or exceeded (e.g., a static image has been detected), the electronic device 302 reduces 412 display resource 306 usage. As noted above, examples of display resources 306 include contrast (ratio) 328, brightness 322, refresh rate 324, image processing 320, decoding 326 and/or clocking 330. The electronic device 302 may reduce 412 one or more display resources 306. For example, the electronic device 302 reduces 412 the contrast ratio (optionally based on an image's dynamic range) 328, brightness 322, refresh rate 324, image processing 320, decoding 326 and/or clocking 330. Reducing 412 one or more of the display resources 306 may conserve energy (e.g., electrical power provided by the battery 316). Furthermore, reducing 412 one or more display resources 306 may lengthen the life of the display panel 304.

The electronic device 302 may determine 414 whether there is a write access request for image memory 338. For example, the electronic device 302 determines whether a component (e.g., application, processor, etc.) has requested access to write or has written information to the image memory 338 (while display resource 306 usage is reduced 412). If no write access request for the image memory 338 has occurred, the electronic device 302 may continue to reduce 412 display resource 306 usage. For example, the electronic device 302 may maintain the reduced state of the display resources 306 or may reduce one or more display resources 306 further. In some configurations, whether to reduce the one or more display resources 306 further may depend on an amount of time that the image has remained static (according to the timer 334, for example). Additionally or alternatively, in some configurations, the electronic device 302 may transition to another mode with reduced contrast ratio 328 and/or a "muted" or blank display.

If a write access request for image memory 338 has occurred, the electronic device 302 may adjust 416 display resource 306 usage. For example, the electronic device 302 may return to regular display resource 306 usage. In one configuration, the electronic device 302 increases the display resource 306 usage to a previous level (e.g., from during presentation of a dynamic image). The electronic device 302 may also reset 404 the timer 334.

In an alternative configuration, the electronic device 302 may determine whether the write access request for image memory 338 has changed or will change the displayed image that meets or exceeds an image change threshold. Similar to that described above, if one or more write access requests for image memory 338 change the displayed image less than the image change threshold, then the electronic device 302 may continue to reduce 412 display resource usage. However, if the image change threshold is met or exceeded, the electronic device 302 may adjust 416 display resource 306 usage (e.g., return to regular display resource 306 usage).

Figure 5:
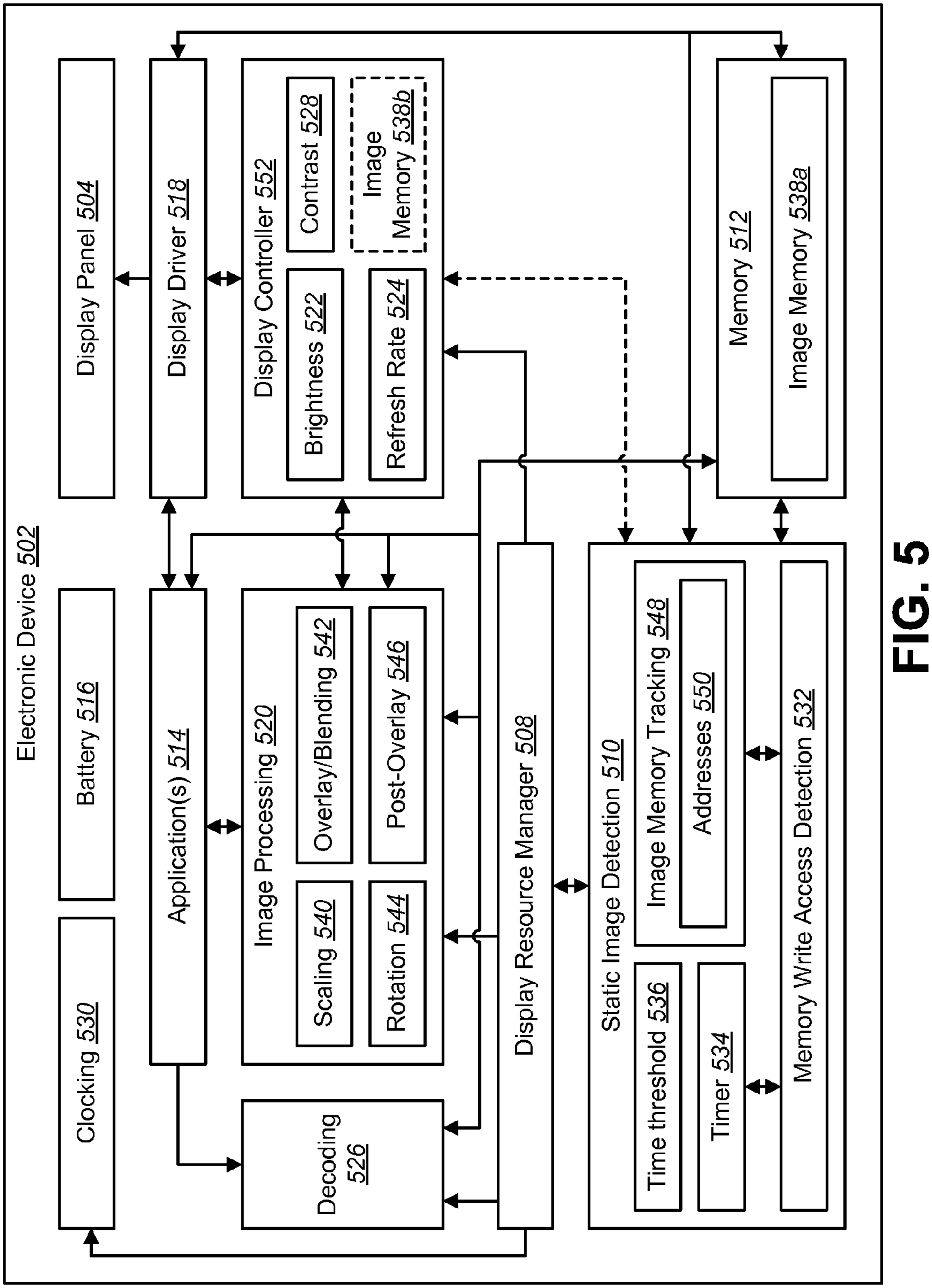
FIG. 5 is a block diagram illustrating another more specific configuration of an electronic device in which systems and methods for detecting static images and reducing resource usage may be implemented.

FIG. 5 is a block diagram illustrating another more specific configuration of an electronic device 502 in which systems and methods for detecting static images and reducing resource usage may be implemented. The electronic device 502 includes a display panel 504, display driver 518, display controller 552, image processing block and/or module 520, decoding block and/or module 526, a display resource manager 508, a static image detection block and/or module 510, memory 512, one or more applications 514, clocking block and/or module 530 and a battery 516.

The display panel 504 may be a device that conveys visual information. Examples of a display panel 504 include a Liquid Crystal Display (LCD), an Organic Light Emitting Diode (OLED) display, an Active Matrix Organic Light Emitting Diode (AMOLED) display, a Digital Light Processing (DLP) display, plasma display, etc. More general examples of the display panel 504 include a computer monitor, a projector, a television display, a touch screen, etc. The display panel 504 may be used to display images, such as changing images and unchanging (e.g., static or stationary) images.

The display driver 518 is a module that the electronic device 502 uses to operate its display panel 504. One example of a display driver 518 is a software module that interfaces the display panel 504 with other components (e.g., software and/or hardware) of the electronic device 502. For instance, an application 514 may use the display driver 518 to display an image on the display panel 504. More specifically, a display driver 518 may translate instructions and/or information from an application 514 or operating system into instructions and/or information for the display panel 504. In one configuration, the display driver 518 may manage memory used for image information.

The display controller 552 is a block and/or module of the electronic device 502 used to control the display panel 504. For example, the display controller 552 includes controls for adjusting the brightness 522, contrast (ratio) 528 and refresh rate 524 of the display panel 504. In one configuration, for instance, the display controller 552 may control the brightness of the display panel 504 by varying a voltage used to drive a backlight or the luminance of the display panel 504. The display controller 552 may also vary a voltage used to change the contrast 528 of the display panel 504. The display controller 552 may also increase or decrease a refresh rate 524. In another configuration, the display controller 552 may provide instructions (e.g., digital signals) to components that control brightness 522, contrast 528 and/or refresh rate 524. In other configurations, the display controller 552 may adjust one or more currents, capacitances, gains or other factors that may be used to control brightness 522, contrast 528 and/or refresh rate 524. Thus, the display controller 552 may control and/or be used to control brightness 522, contrast (ratio) 528 and refresh rate 524. In some configurations, the display controller 552 may also include image memory 538*b*. Image memory 538*b* in the display controller 552 may be one or more display buffers. In such a configuration, a host multimedia processor may identify static images and transition to a static image mode (with reduced resource usage) or dormancy. In such a case, the display controller 552 may determine static image detection power performance.

The image processing block and/or module 520 may perform image processing for images presented on the display panel 504. Some examples of image processing that may be performed by the image processing block and/or module 520 include scaling 540, rotation 544, overlay and/or blending 542 and post-overlay processing 546. For instance, scaling 540 an image may involve stretching or shrinking an image to a given size. Rotating 544 an image may involve rotating or mapping the image to a different orientation (e.g., pixels along an "x" axis in Cartesian coordinates may be mapped to a "y" axis). Overlay and/or blending 542 may involve processing an image based on another image in a different plane or surface. For example, an image in a foreground may be processed to appear semitransparent, allowing a background image to be seen "through" the foreground image. Post-overlay processing 546 may include processing that is performed after overlay processing 542 has occurred. In some configurations, examples of post-overlay processing 546 may include color conversion, contrast ratio and pixel dynamic range enhancements, spatial scaling, temporal scaling (e.g., frame rate up-conversion) and/or rotation, etc.

The decoding block and/or module 526 may decode image information. For example, the decoding block and/or module 526 may decode a video file in a particular format for presentation. One example of a decoding block and/or module 526 is an H.264 video decoder. The clocking block and/or module 530 may determine or control the clocking (e.g., frequency of operation) of electronic device 502 components (e.g., processors, buses, memory 512, etc.).

The display resource manager 508 is a block and/or module used to control one or more aspects of the display controller 552 (e.g., contrast ratio 528, brightness 522, refresh rate 524), image processing block and/or module 520, decoding block and/or module 526 and/or clocking block and/or module 530 used to present an image. In one configuration, the display resource manager 508 controls these components 552, 520, 526, 530 based on whether or not a static image is presented on the display panel 504. For example, the static image detection block and/or module 510 indicates whether a static image is being presented on the display panel 504 to the display resource manager 508. The display resource manager 508 may control the components 552, 520, 526, 530 based on this indication. For example, the display resource manager 508 reduces the contrast ratio 528, brightness 522, refresh rate 524 and/or optionally image memory or buffers 538*b* (via the display controller 552) when the display panel 504 is presenting a static image. Additionally or alternatively, the display resource manager 508 may control the image processing 520, decoding 526 and/or clocking 530 while a static image is being presented. In one configuration, the display resource manager 508 also adjusts one or more of these components 552, 520, 526, 530 based on the image that is being presented. For example, the display resource manager 508 may reduce the contrast ratio 528 based on the dynamic range (e.g., luminance range) of the image being presented on the display panel 504.

The static image detection block and/or module 510 detects whether a static (e.g., an unchanging) image is presented on the display panel 504. In one configuration, the static image detection block and/or module 510 includes a memory write access detection block and/or module 532, a timer 534, a time threshold 536 and/or an image memory tracking block and/or module 548. In one configuration, the memory write access detection block and/or module 532 detects whether a static image is being presented by monitoring the image memory 538*a*. For example, the static image detection block and/or module 510 may use the image memory tracking block and/or module 548 to track image memory 538*a* (e.g., distinguish image memory 538*a* from other portions of memory 512). For instance, the image memory tracking block and/or module 548 may obtain addresses (e.g., memory pointers, addresses or a range thereof) 550 from the display driver 518. In one configuration, this may occur as the display driver 518 allocates image memory 538*a* for electronic device components (e.g., applications 514) that request memory 512 to present an image, for example.

The static image detection block and/or module 510 may monitor the image memory 538*a* using the memory write access detection block and/or module 532 based on the addresses 550 being tracked by the image memory tracking block and/or module 548. It 510 may do this to determine whether there is a write access request for the image memory 538*a* that is being used to present an image. For instance, the static image detection block and/or module 510 sets the timer 534 and monitors the image memory 538*a* for write access requests corresponding to memory addresses 550 used for presenting the image on the display panel 504. If no such write access request occurs for an amount of time (where a time limit or time threshold 536 is met or exceeded, for example), then the static image detection block and/or module 510 indicates that a static image is displayed to the display resource manager 508. However, if a write access request for the image memory 538*a* occurs, it 510 resets the timer 534. Additionally or alternatively, the static image detection block and/or module 510 may track the addresses of image memory 538*b* included on the display controller 552. Similarly, if no write access requests to the image memory or buffers 538*b* occur within the time threshold 536, the memory write access detection block and/or module 532 may indicate that a static image is being displayed to the display resource manager 508.

The memory 512 may include image memory 538*a*. Image memory 538*a* may be memory that is allocated for the display or presentation of images. The memory 512 may be separate from other components of the electronic device 502. As illustrated, image memory 538*b* may additionally or alternatively be included in the display controller 552.

The one or more applications 514 are software or programs. Examples of applications 514 include photo viewing applications, video games, productivity software (e.g., word processors, spreadsheet software, presentation software, database management software, etc.) and multimedia players, etc. In some configurations, the one or more applications 514 generate images (e.g., user interfaces (UIs), pictures, icons, video, still pictures, etc.) for presentation on the display panel 504. For example, an application 514 produces write access memory requests to access the image memory 538*a* (and/or 538*b*) in order to produce changing or unchanging images on the display panel 504.

The battery 516 provides electrical power or energy to the electronic device 502. One example of the battery 516 is a lithium-ion battery. In general, the electronic device 502 consumes power from the battery 516 to operate. The amount of power consumed depends on how the electronic device 502 components are used to present an image on the display panel 504. For example, the higher the contrast ratio 528, brightness 522, refresh rate 524, amount of image processing 520, clocking frequency 530 and amount of decoding 526 performed by the electronic device 502, the larger the power consumption. In one configuration, the electronic device 502 conserves its battery 516 power by reducing the amount of operations performed by the electronic device 502 components when a static image is being presented on the display panel 504. Reduction of other component or resource (e.g., memory) usage may additionally or alternatively be performed to conserve battery 516 power.

Figure 6:
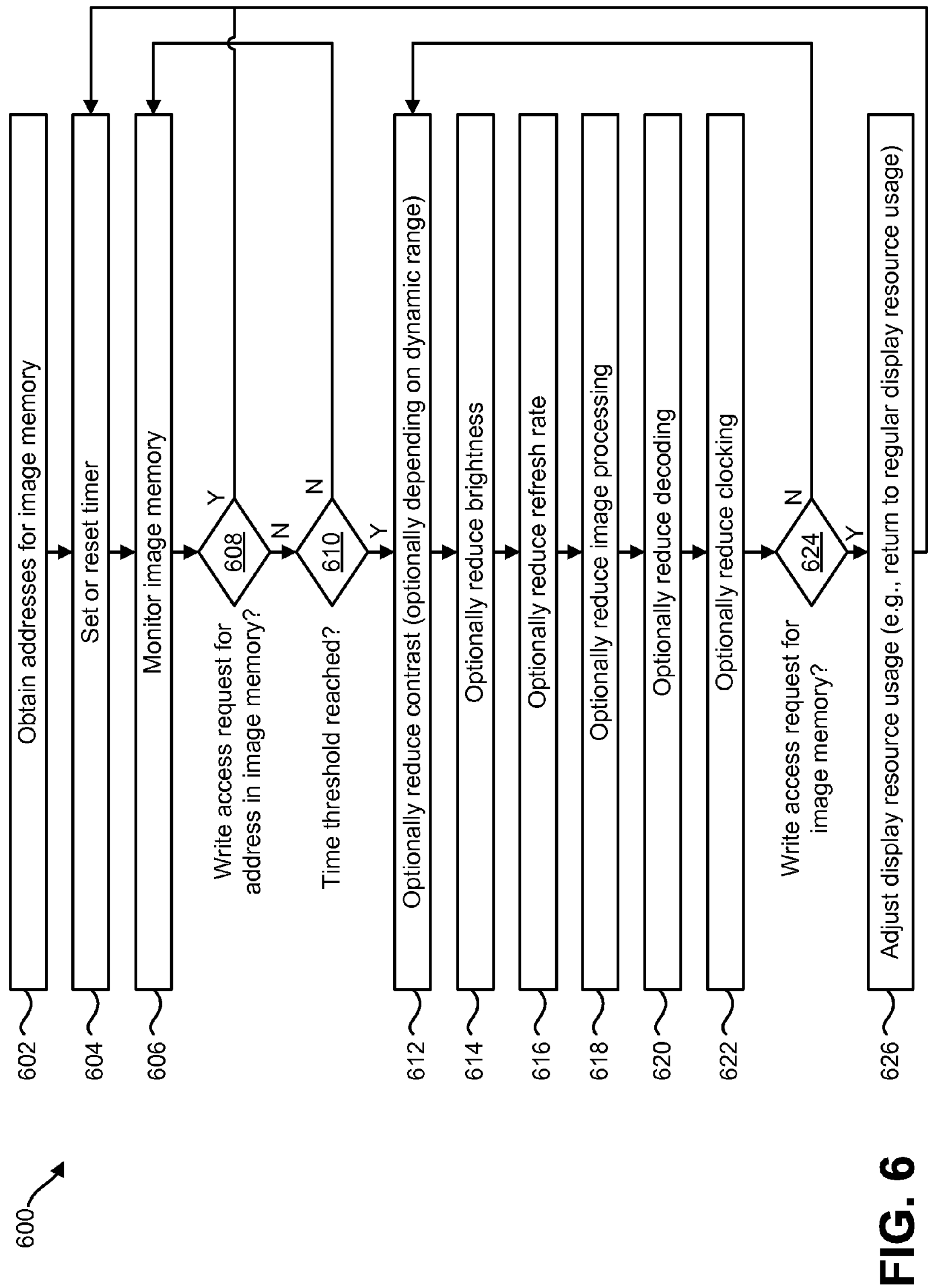
FIG. 6 is a flow diagram illustrating another more specific configuration of a method for detecting static images and reducing resource usage on an electronic device.

FIG. 6 is a flow diagram illustrating another more specific configuration of a method 600 for detecting static images and reducing resource usage on an electronic device 502. An electronic device 502 may obtain 602 addresses 550 for memory 512 used as image memory 538*a*. In one configuration, when a component (e.g., application 514, graphics processor, etc.) attempts to present an image on the display panel 504, the display driver 518 provides an address, pointer or range of addresses or pointers corresponding to memory 512 (e.g., a buffer) where image information or data may be written. The electronic device 502 (e.g., static image detection block and/or module 510) may obtain 602 the addresses, pointers or ranges thereof 550 from the display driver 518 to distinguish image memory 538*a* from other portions of memory 512. In other words, memory 512 at these addresses, pointers or ranges thereof 550 that are used for presenting images may be designated as image memory 538*a*, while other portions of memory 512 may not be. Additionally or alternatively, the electronic device 502 may obtain 602 addresses 550 for image memory 538*b* included on a display controller 552.

The electronic device 502 may set or reset 604 a timer 534. The timer 534 provides an amount of time from when it 534 was set or reset 604. The timer 534 may be based on a clock signal produced by a clock generator. In one configuration, the electronic device 502 includes an integrated circuit that produces a clock signal. More specifically, when the electronic device 502 sets or resets 604 the timer 534, the timer 534 begins to track time from the instant or moment it was set or reset 604.

The electronic device 502 monitors 606 image memory 538*a* to determine whether a component (e.g., an application 514, processor or other software or hardware) is requesting access to write information or data to the image memory 538*a* (and/or 538*b*). For example, the electronic device 502 (e.g., memory write access detection block and/or module 532) monitors write access requests that correspond to a particular memory address, pointer or range thereof 550 used for presenting images. The electronic device 502 determines 608 whether a write access request for image memory 538*a* (and/or 538*b*) has occurred. For example, the memory write access detection block and/or module 532 detects or is notified when a write access request corresponding to the image memory 538*a* has occurred. If a write access request for image memory 538*a* has occurred, the electronic device 502 resets 604 the timer 534.

If a write access request for image memory 538*a* (and/or 538*b*) has not occurred, the electronic device 502 determines 610 whether a time threshold 536 has been reached or exceeded. For example, the electronic device 502 may make this determination 610 as illustrated in Equation (1) above. In one configuration, the time threshold 536 is 100 ms. The time threshold 536 may be other amounts of time in other configurations. It should be noted that an image that has remained unchanged for at least the time threshold 536 amount of time may be deemed a “static” image. If the time threshold 536 has not been reached or exceeded, the electronic device 502 continues monitoring 606 image memory 538*a* (and/or 538*b*).

If the time threshold 536 has been reached or exceeded (e.g., a static image has been detected), the electronic device 502 may optionally perform one or more actions (in an effort to conserve energy, for example). The electronic device 502 may optionally reduce 612 a contrast (ratio) 528. For example, the electronic device 502 (e.g., display resource manager 508) may adjust a voltage, current, gain, instruction or make some other adjustment in order to reduce 612 the contrast 528 of the display panel 504. In one configuration, the display resource manager 508 may reduce a voltage that drives a display panel 504 contrast 528, thereby reducing the contrast 528. In another configuration, the display resource manager 508 may send an instruction to the display controller 552 that causes it 552 to reduce the contrast 528. Reducing 612 the contrast 528 may optionally be additionally based on the dynamic range of the (static) image being displayed. For example, the electronic device 502 may determine the dynamic range of the image being displayed and reduce 612 the contrast 528 to a point where the image is adequately displayed while reducing 612 the contrast 528 (if possible).

The electronic device 502 may optionally reduce 614 brightness 522. For example, the electronic device 502 (e.g., display resource manager 508) may adjust a voltage, current, gain, instruction or make some other adjustment in order to reduce 614 the brightness 522 of the display panel 504. In one configuration, the display resource manager 508 may reduce a voltage that drives a display panel 504 brightness (e.g., backlight), thereby reducing the brightness 522 of the display panel 504. In another configuration, the display resource manager 508 may send an instruction to the display controller 552 that causes it 552 to reduce the brightness 522.

The electronic device 502 may optionally reduce 616 a refresh rate 524. For example, the electronic device 502 (e.g., display resource manager 508) may adjust a voltage, current, gain, instruction or make some other adjustment in order to reduce 616 the refresh rate 524 of the display panel 504. In one configuration, the display resource manager 508 may reduce a voltage that drives a display panel 504 refresh rate 524, thereby reducing the refresh rate 524 of the display panel 504. In another configuration, the display resource manager 508 may send an instruction to the display controller 552 that causes it 552 to reduce the refresh rate 524. It should be noted that adjusting the refresh rate 524 may involve adjusting refresh rate, frame rate, update rate and/or scan rate.

The electronic device 502 may optionally reduce 618 image processing 520. For example, the electronic device 502 (e.g., display resource manager 508) may adjust a voltage, current, gain, instruction or make some other adjustment in order to reduce 618 the image processing 520. For instance, the display resource manager 508 may suspend or reduce the rate at which image processing 520 occurs. More specifically, the display resource manager 508 may suspend or reduce the processing rate for scaling 540, rotation 544, overlay/blending 542 and/or post-overlay processing 546. In another configuration, the display resource manager 508 may send an instruction to the image processing block and/or module 520 to reduce image processing.

The electronic device 502 may optionally reduce 620 decoding 526. For example, the electronic device 502 (e.g., display resource manager 508) may adjust a voltage, current, gain, instruction or make some other adjustment in order to reduce 620 the decoding 526. For instance, the display resource manager 508 may suspend or reduce the rate at which decoding 526 occurs. In another configuration, the display resource manager 508 may send an instruction to the decoding block and/or module 526 to reduce decoding.

The electronic device 502 may optionally reduce 622 clocking 530. For example, the electronic device 502 (e.g., display resource manager 508) may adjust a voltage, current, gain, instruction or make some other adjustment in order to reduce 622 the clocking 530 (rate). For instance, the display resource manager 508 may suspend or reduce the clocking 530 rate by changing a Voltage-Controlled Oscillator (VCO) input voltage in a Phase-Lock-Loop (PLL) that supplies clocking 530. Alternatively, the display resource manager 508 may select a (different) frequency divider output, thereby reducing 622 the clocking 530. In another configuration, the display resource manager 508 may send an instruction to the clocking block and/or module 530 to reduce a clocking 530 rate. Reductions applying to other electronic device 502 components (e.g., memory 512, 538*a* and/or 538*b*) may optionally be performed.

The electronic device 502 may determine 624 whether there is a write access request for image memory 538*a* (and/or 538*b*). For example, the electronic device 502 determines whether a component (e.g., application 514, processor, etc.) has requested access to write or has written information to the image memory 538*a* (and/or 538*b*). If no write access request for the image memory 538*a* (and/or 538*b*) has occurred, the electronic device 502 may continue to reduce 612 display resource (e.g., contrast 528, brightness 522, refresh rate 524, image processing 520, decoding 526 and/or clocking 530) usage. For example, the electronic device 502 may maintain the reduced state of the display resources or may reduce one or more display resources further. In some configurations, whether to reduce the one or more display resources further may depend on an amount of time that the image has remained static (according to the timer 534, for example). In some configurations, the electronic device 502 may transition to another mode (e.g., muted or blank display mode).

If a write access request for image memory 538*a* (and/or 538*b*) has occurred, the electronic device 502 may adjust 626 display resource (e.g., contrast 528, brightness 522, refresh rate 524, image processing 520, decoding 526 and/or clocking 530) usage. For example, the electronic device 502 may return to regular display resource usage. In one configuration, the electronic device 502 increases the display resource usage to a previous level (e.g., from during presentation of a dynamic image). The electronic device 502 may also reset 604 the timer 534.

Figure 7:
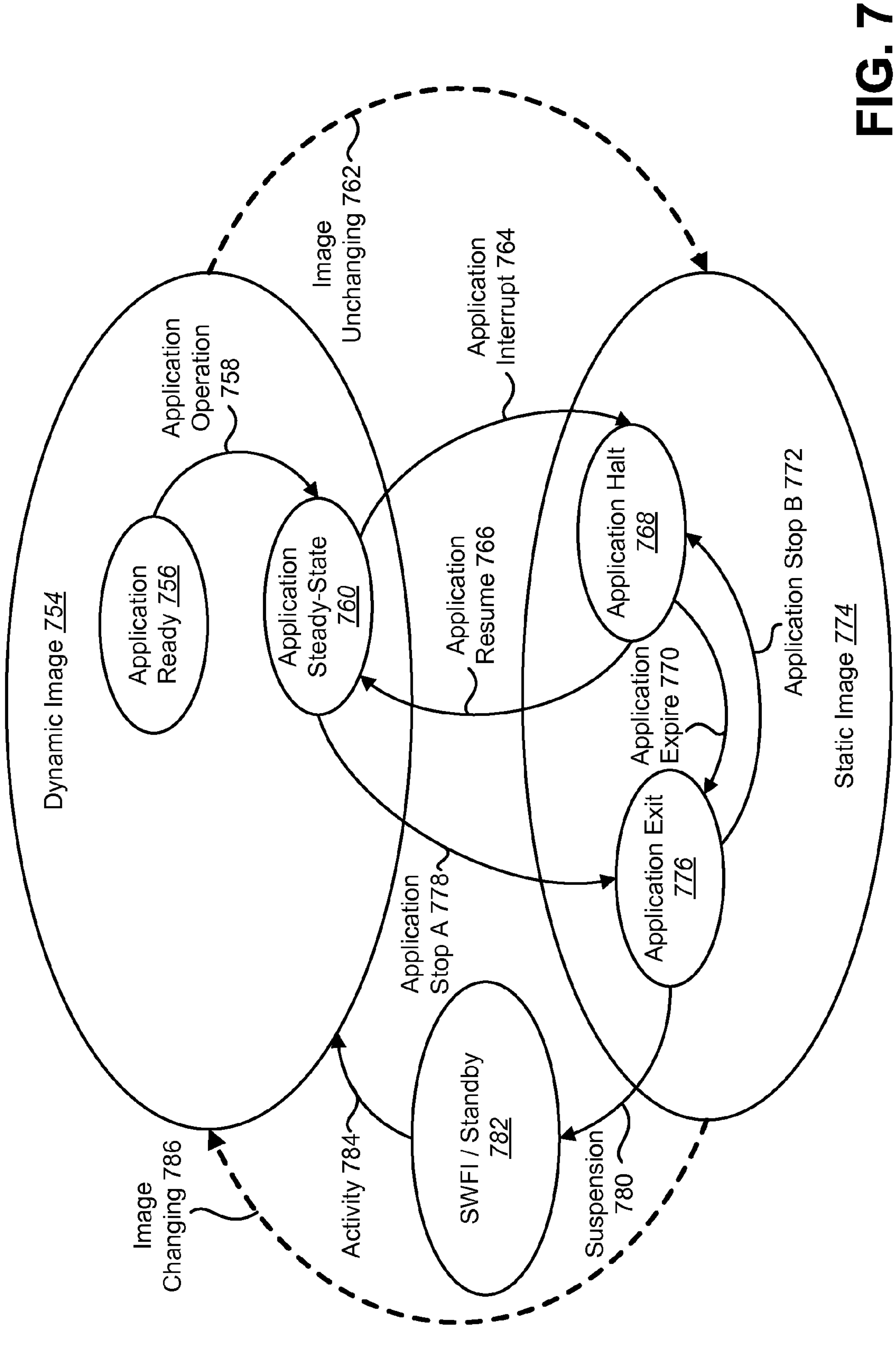
FIG. 7 is a diagram illustrating one example of states and state transitions between a dynamic image state or mode and a static image state or mode.

FIG. 7 is a diagram illustrating one example of states and state transitions between a dynamic image state or mode 754 and a static image state or mode 774. In one configuration, an electronic device 102 may operate according to the dynamic image state or mode 754 and the static image state or mode 774. In general, the electronic device 102 may transition between the dynamic image state or mode 754 and the static image state or mode 774. For example, the electronic device 102 may transition from the dynamic image mode 754 to the static image mode 774 when a displayed image is unchanging 762. Furthermore, the electronic device 102 may transition from the static image mode 774 to the dynamic image mode 754 when the image is changing 786.

Within the dynamic image mode 754, an electronic device 102 may begin in an application ready state 756. For example, an application 114 may be started and ready for operation. When the application 114 begins to operate 758 or displays an image, the electronic device 102 enters an application steady-state 760. While in the application steady-state 760, the electronic device 102 (e.g., application 114) may produce a changing or dynamic image 754. For instance, the application 114 may present a series of images on the display 104.

If the electronic device 102 (e.g., application 114) begins to present an unchanging image (e.g., unchanging UI, unchanging viewfinder, etc.), the electronic device 102 may enter an application halt state 768 (in the static image mode 774) via an application interrupt 764 transition. The application interrupt transition 764 may occur when the electronic device 102 reduces display resources 106 (e.g., contrast, brightness, image processing, decoding and/or clocking, etc.). In the application halt state 768, the electronic device 102 (e.g., application 114) may present the static image using reduced display resources 106.

If the electronic device 102 (e.g., application 114) changes the image displayed, then the electronic device 102 (e.g., application 114) returns to the application steady-state 760 via an application resume transition 766. Or, from the application halt state 768, the electronic device 102 (e.g., application 114) may transition to an application exit state 776 via an application expire 770 transition. This may occur if an application 114 is inactive for a certain period of time, for example. In one configuration, this may be indicated by a timer 334. In the application exit state 776, the electronic device 102 may prepare to terminate or discontinue running an application 114. However, the electronic device 102 may return to the application halt state 768 via an application stop transition B 772. The application stop transition B 772 may occur, for example, if the application 114 at hand is not allowed to be terminated (e.g., automatically terminated), if the application 114 resumes some activity (without changing the displayed image, for example) or if the electronic device 102 receives a directive (from a user, for example) to not terminate the application 114.

In another case, the electronic device 102 may enter the application exit state 776 from the application steady-state 760 via an application stop transition A 778. The application stop transition A 778 may occur when an application 114 has finished running (automatically, for example), a directive is received (from a user, for example) to terminate the application 114 or if some other component (e.g., anti-virus software, some other application 114, a power manager component, etc.) directs termination of the application 114. Thus, the electronic device 102 may transition from the dynamic image mode 754 to the static image mode 774 via an application interrupt transition 764 or an application stop A transition 778.

From the application exit state 776, the electronic device 102 may transition to a Suspend and Wait for Interrupt (SWFI) or standby mode 782 via a suspension transition 780. The suspension transition 780 may occur, for example, when an application 114 has become inactive or terminated. In this case, the electronic device 102 (e.g., the application 114) may await activity 784 to transition to the dynamic image mode 754. Thus, the electronic device 102 (e.g., the application 114) may remain in the SWFI/standby state 782 until the electronic device 102 (e.g., the application 114) receives some relevant activity 784 (e.g., a user interacting with the electronic device 102, starting an application 114, etc.). When this activity 784 occurs, the electronic device 102 may enter (or re-enter) the dynamic image mode 754, thereby updating the display 104. Thus, the electronic device 102 may transition from the static image mode 774 to the dynamic image mode 754 when the image is changing 786 via an activity transition 784 or an application resume transition 766. In another configuration, the static image detection systems and methods disclosed herein may be used to transition to the SWFI/standby mode 782. For example, if the timer 334 indicates that no write access requests have been made to memory 538*a* (and/or 538*b*), the electronic device 102 may trigger suspension 780.

It should be noted that transitioning between the dynamic image mode 754 and static image mode 774 may occur further based on a system configuration. The system configuration may include factors such as a time threshold 336, what types of operations qualify to cause transitions and so on upon which transitions may be triggered. These transitions may include activity 784, suspension 780, application stop A 778, application expire 770, application stop B 772, application resume 766 and/or application interrupt 764 transitions, for example.

It should be noted that a display image status is different from a use case. For example, a use case may be in transition and a display may be in a static image mode 774. Otherwise, a use case may be in standby, but a display may be in a dynamic image mode 754 (e.g., because of variations in ambient lighting or user's view, etc.).

Figure 8:
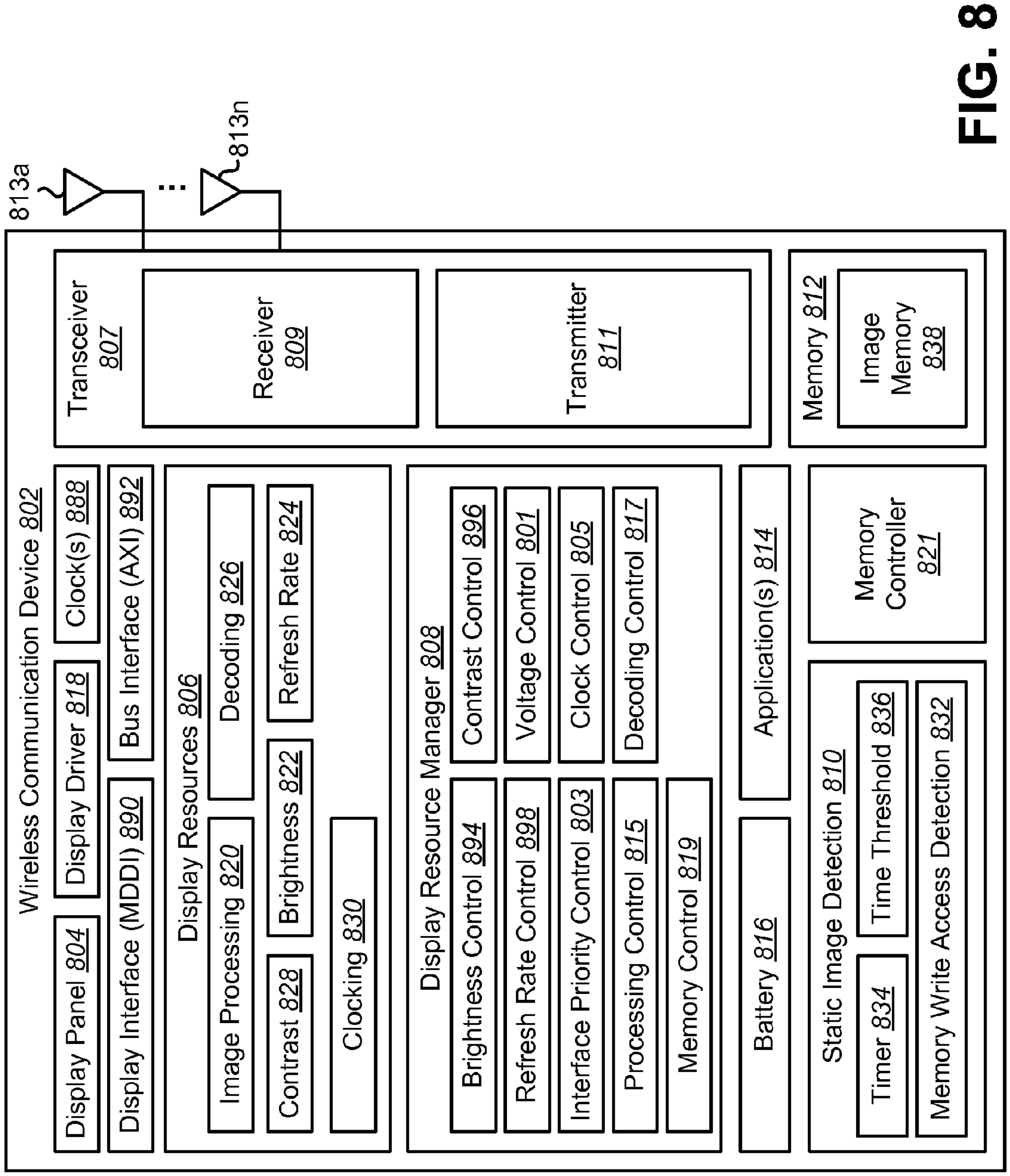
FIG. 8 is a block diagram illustrating an example of one configuration of a wireless communication device in which systems and methods for detecting static images and reducing resource usage may be implemented.

FIG. 8 is a block diagram illustrating an example of one configuration of a wireless communication device 802 in which systems and methods for detecting static images and reducing resource usage may be implemented. The wireless communication device 802 includes a display panel 804, display driver 818, one or more clocks 888, a display interface (e.g., Mobile Display Digital Interface (MDDI)) 890, bus interface (e.g., Advanced Extensible Interface (AXI)) 892, display resources 806, a display resource manager 808, a static image detection block and/or module 810, memory 812, one or more applications 814, a battery 816, a memory controller 821, a transceiver 807 and one or more antennas 813*a-n*. The wireless communication device 802 may be a device that wirelessly communicates with other electronic devices (e.g., base stations, other wireless communication devices, etc.). Examples of the wireless communication device 802 include cellular phones, smart phones, Personal Digital Assistants (PDAs), wireless game systems, tablet devices, laptop computers, etc.

The display panel 804 may be a device that conveys visual information. Examples of a display panel 804 include a Liquid Crystal Display (LCD), an Organic Light Emitting Diode (OLED) display, an Active Matrix Organic Light Emitting Diode (AMOLED) display, a Digital Light Processing (DLP) display, plasma display, touchscreen, etc. The display panel 804 may be used to display images, such as changing images and unchanging (e.g., static or stationary) images.

The display driver 818 is a module that the wireless communication device 802 uses to operate its display panel 804. One example of a display driver 818 is a software module that interfaces the display panel 804 with other components (e.g., software and/or hardware) of the wireless communication device 802. For instance, an application 814 may use the display driver 818 to display an image on the display panel 804. More specifically, a display driver 818 may translate instructions and/or information from an application 814 or operating system into instructions and/or information for the display panel 804. In one configuration, the display driver 818 may manage image memory 838 used for image information. In some configurations, a display controller (not shown) is also included on the wireless communication device 802.

The one or more clocks 888 may be clock generators used for generating clock signals for use in the wireless communication device 802. One example of a clock 888 is a Voltage Controlled Oscillator (VCO). The VCO frequency or the output clock signal frequency may be adjusted by varying an input voltage. The one or more clocks 888 may generate clock signals (e.g., timing signals) such that the components of the wireless communication device 802 may function. The one or more clocks 888 may also include frequency dividers to generate clock signals at other (divided) frequencies.

The display interface (e.g., Mobile Display Digital Interface (MDDI)) 890 may be an interface used to connect the display panel 804 with other components of the wireless communication device 802. In one configuration, the display interface 890 is used to connect the display panel 804 to other components in the wireless communication device 802 in a clamshell or flip configuration.

The bus interface (e.g., Advanced Extensible Interface (AXI)) 892 may be an interface that is used to control a bus system that connects various modules of the wireless communication device 802. For example, the bus interface 892 may be used to control bus timing, addressing and/or priorities.

The display resources 806 may include resources that are used to operate the display panel 804 or resources that characterize the operation of the display panel 804. In the configuration illustrated in FIG. 8, the display resources 806 include contrast (ratio) 828, brightness 822, refresh rate 824, image processing 820, decoding (e.g., video or image decoding) 826 and clocking 830. Each of these display resources 806 may affect the operation of the display panel 804. For example, the contrast ratio 828 may control or determine the amount of contrast in an image produced by the display panel 804. The brightness 822 may control or determine the amount of light emitted by the display panel 804. The refresh rate 824 may control or determine how often the display panel 804 is refreshed (e.g., how often another frame of pixels is output). Image processing 820 may be used to perform processing on an image to be displayed. Examples of image processing 820 include overlay image processing, scaling and rotation, etc. Decoding 826 may be used to decode images for display. For example, a video file or stream may need to be decoded before presentation on the display panel 804. Clocking 830 may determine the frequency or speed at which components used for operating the display panel 804 or generating images may run. For instance, the clocking 830 may be adjusted to vary the frequency at which image processing computations occur, at which image memory 838 is updated and/or at which a bus operates.

The display resource manager 808 is a block and/or module used to control the display resources 806 and other components related to the presentation of images on the display panel 804. For example, the display resource manager 808 may control the contrast ratio 828, brightness 822, refresh rate 824, image processing 820, decoding 826, clocking 830, interface priority and/or various voltages used to present an image. In one configuration, the display resource manager 808 controls the display resources 806 based on whether or not a static image is presented on the display panel 804. For example, the static image detection block and/or module 810 indicates whether a static image is being presented on the display panel 804 to the display resource manager 808. The display resource manager 808 may adjust one or more of the display resources 806 and/or other components based on this indication. For example, the display resource manager 808 reduces the contrast ratio 828, brightness 822, refresh rate 824, image processing 820, decoding 826, clocking 830 and/or image memory 838 usage when the display panel 804 is presenting a static image. It should be noted that although the display resource manager 808 may control image memory 838 usage, the image memory 838 may not be considered a display resource 806, but rather a component that may be controlled to reduce resource usage. In one configuration, the display resource manager 808 also adjusts the display resources 806 based on the image that is being presented. For example, the display resource manager 808 may reduce the contrast ratio 828 based on the dynamic range (e.g., luminance range) of the image being presented on the display panel 804.

The display resource manager 808 may control the display resources and/or other components by using various controls. For example, the display resource manager 808 may include a brightness control 894, contrast control 896, refresh rate control 898, voltage control 801, interface priority control 803, clock control 805, processing control 815 and/or decoding control 817. One or more of these controls may be used in conjunction with each other and/or with various wireless communication device 802 components to achieve control. The brightness control 894 may be used to control the brightness 822. The contrast control 896 may be used to control the contrast 828. The display resource manager 808, for example, may use the voltage control 801 in order to control the brightness 822 and/or contrast 828. More specifically, the display panel 804 may display images at varying brightness 822 and/or contrast 828 based on the amount of driving voltage provided to display panel 804 components. Thus, the display resource manager 808 may vary the brightness 822 and/or contrast 828 according to the brightness control 894, contrast control 896 and/or voltage control 801.

The display resource manager 808 may also control the refresh rate 824 using a refresh rate control 898 and/or clock control 805. For example, the refresh rate 824 may be controlled by using the refresh rate control 898 and/or the clock control 805. For instance, the display resource manager 808 may use the clock control 805 to reduce the frequency of the clock(s) 888 (thus reducing clocking 830, for example), which in turn may reduce the frequency of the refresh rate 824 of the display panel 804.

The display resource manager 808 may use a processing control 815 to control the image processing 820. For example, the processing control 815 may suspend or reduce image processing 820 operations while the display image is static. This may optionally be accomplished using the clock control 805 or some other mechanism.

The display resource manager 808 may use an interface priority control 803 to control the display interface (MDDI) 890 and/or the bus interface (AXI) 892. For example, the display resource manager 808 may use the interface priority control 803 to give certain traffic priority on the bus while in static image mode and/or while transitioning to and from static image mode. Furthermore, the display resource manager 808 may use the clock control 805 to control the one or more clocks 888 (and thus clocking 830) in order to control the display interface (MDDI) 890 and/or the bus interface (AXI) 892. For example, display interface (MDDI) 890 speed and/or bus interface (AXI) 892 speed may be reduced while a static image is being displayed using the clock control 805.

The display resource manager 808 may use the decoding control 817 in order to control the decoding 826 of images (e.g., video files). For example, the decoding control 817 may be used to suspend or reduce decoding 826 speed.

The display resource manager 808 may use a memory control 819. Memory control 819 may use the memory controller 821 in order to change memory 812 (e.g., image memory 838) functionality. For example, the memory control 819 (and/or the clock control 805) may be used to reduce the memory 812 update or refresh rate by instructing the memory controller 821 to reduce its update rate. As implied by this discussion, the memory controller 821 controls the functioning of the memory 812 (e.g., update or refresh rate, etc.). It should be noted that the display resource manager 808 may control one or more of the display resources 806 and/or other components using a display controller. By reducing image memory 838 resource usage, the wireless communication device 802 may reduce battery 816 power consumption.

The static image detection block and/or module 810 detects whether a static (e.g., unchanging) image is presented on the display panel 804. In one configuration, the static image detection block and/or module 810 includes a memory write access detection block and/or module 832, a timer 834 and/or a time threshold 836. In one configuration, the memory write access detection block and/or module 832 detects whether a static image is being presented by monitoring the memory 812. For example, it 832 monitors the image memory 838 (within the memory 812 and/or memory 812 within a display controller, for example) to determine whether there is a write access request for the image memory 838 that is being used to present an image. For instance, the static image detection block and/or module 810 sets the timer 834 and monitors the image memory 838 for write access requests corresponding to memory addresses used for presenting the image on the display panel 804. If no such write access request occurs for an amount of time (where a time limit or time threshold 836 is met or exceeded, for example), then the static image detection block and/or module 810 indicates that a static image is displayed to the display resource manager 808. However, if a write access request for the image memory 838 occurs, it 810 resets the timer 834.

The memory 812 may include image memory 838. Image memory 838 may be memory that is allocated for the display or presentation of images. The memory 812 may be separate from other components of the wireless communication device 802. In other configurations, image memory 838 may be included on a display controller.

The one or more applications 814 are software or programs. Examples of applications 814 include photo viewing applications, video games, productivity software (e.g., word processors, spreadsheet software, presentation software, database management software, etc.) and multimedia players, etc. In some configurations, the one or more applications 814 generate images (e.g., user interfaces (UIs), pictures, icons, video, still pictures, etc.) for presentation on the display panel 804. For example, an application 814 produces write access memory requests to access the image memory 838 in order to produce changing or unchanging images on the display panel 804. It should be noted that the wireless communication device 802 may also include an operating system (not shown). The operating system may also generate images for the display panel 804 and produce write access memory requests to access the image memory 838.

The battery 816 provides electrical power or energy to the wireless communication device 802. One example of the battery 816 is a lithium-ion battery. In general, the wireless communication device 802 consumes power from the battery 816 to operate. The amount of power consumed depends on the display resources 806 used to present an image on the display panel 804. For example, the higher the contrast ratio 828, brightness 822, refresh rate 824, amount of image processing 820, clocking frequency 830, amount of decoding 826, speed of the display interface (MDDI) 890, speed of the bus interface (AXI) 892 and/or speed of the memory 812 used by the wireless communication device 802, the larger the power consumption. In one configuration, the wireless communication device 802 conserves its battery 816 power by reducing the amount of display resources 806 used and/or usage of other components when a static image is being presented on the display panel 804.

The wireless communication device 802 may use the transceiver 807 to communicate with other electronic devices (e.g., base stations, other wireless communication devices, etc.). The transceiver 807 may include a receiver 809 and a transmitter 811. The receiver 809 may use communication signals received by the one or more antennas 813*a-n*. For instance, the receiver 809 may demodulate and/or decode received communication signals. The transmitter 811 may be used to transmit communication signals. For example, the transmitter 811 may encode and/or modulate communication signals for transmission using the one or more antennas 813*a-n*. Thus, the wireless communication device 802 may communicate with other electronic devices or networks of other electronic devices by transmitting and receiving communication signals. In some cases, information in received communication signals may be used to display images on the display panel 804.

Figure 9:
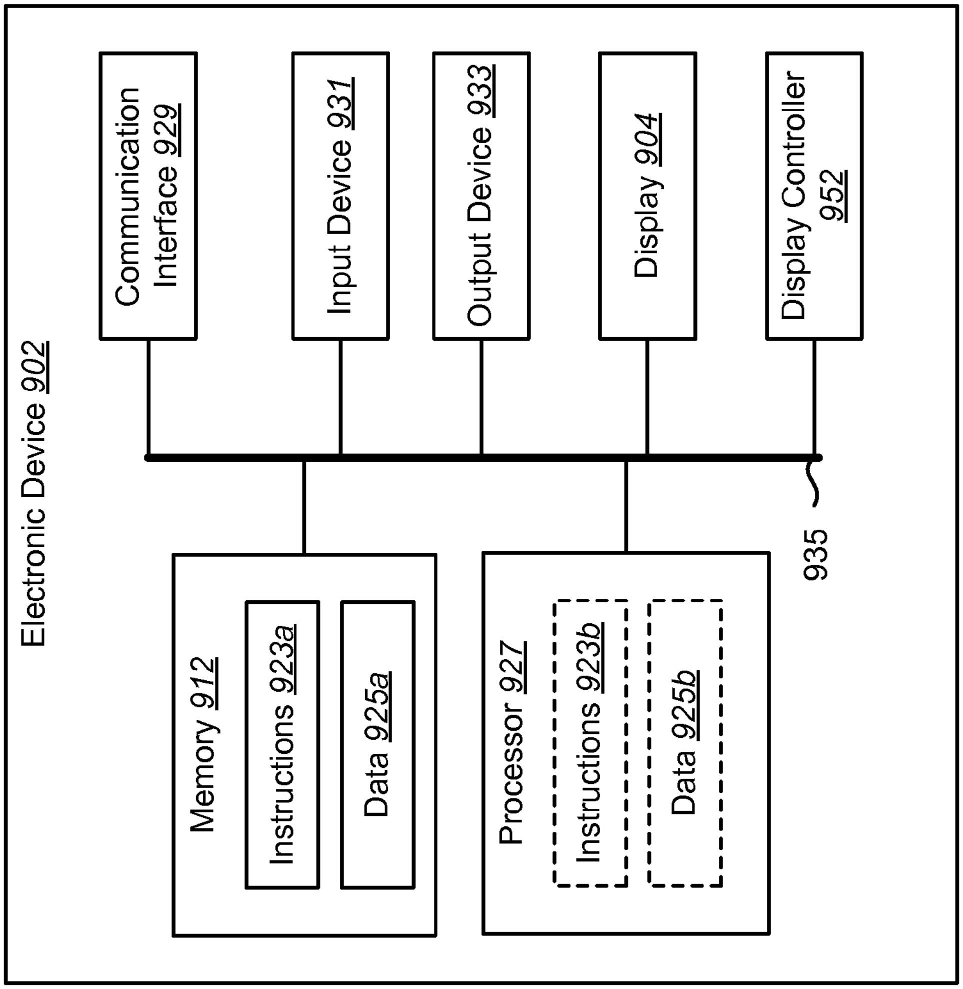
FIG. 9 illustrates various components that may be utilized in an electronic device.

FIG. 9 illustrates various components that may be utilized in an electronic device 902. The illustrated components may be located within the same physical structure or in separate housings or structures. The electronic devices 102, 302, 502 discussed in relation to FIGS. 1, 3, and 5 may be configured similarly to the electronic device 902. The electronic device 902 includes a processor 927. The processor 927 may be a general purpose single- or multi-chip microprocessor (e.g., an ARM), a special purpose microprocessor (e.g., a digital signal processor (DSP)), a microcontroller, a programmable gate array, etc. The processor 927 may be referred to as a central processing unit (CPU). Although just a single processor 927 is shown in the electronic device 902 of FIG. 9, in an alternative configuration, a combination of processors (e.g., an ARM and DSP) could be used.

The electronic device 902 also includes memory 912 in electronic communication with the processor 927. That is, the processor 927 can read information from and/or write information to the memory 912. The memory 912 may be any electronic component capable of storing electronic information. The memory 912 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 925*a* and instructions 923*a* may be stored in the memory 912. The instructions 923*a* may include one or more programs, routines, sub-routines, functions, procedures, etc. The instructions 923*a* may include a single computer-readable statement or many computer-readable statements. The instructions 923*a* may be executable by the processor 927 to implement the methods 200, 400, 600 that were described above. Executing the instructions 923*a* may involve the use of the data 925*a* that is stored in the memory 912. FIG. 9 shows some instructions 923*b* and data 925*b* being loaded into the processor 927.

The electronic device 902 may also include one or more communication interfaces 929 for communicating with other electronic devices. The communication interfaces 929 may be based on wired communication technology, wireless communication technology, or both. Examples of different types of communication interfaces 929 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 902 may also include one or more input devices 931 and one or more output devices 933. Examples of different kinds of input devices 931 include a keyboard, mouse, microphone, remote control device, button, joystick, trackball, touchpad, lightpen, touchscreen, etc. Examples of different kinds of output devices 933 include a speaker, printer, etc. One specific type of output device that may be typically included in an electronic device 902 is a display device 904. Display devices 904 used with configurations disclosed herein may utilize any suitable image projection technology, such as a cathode ray tube (CRT), liquid crystal display (LCD), light-emitting diode (LED), gas plasma, electroluminescence, or the like. A display controller 952 may also be provided for converting data stored in the memory 912 into text, graphics, and/or moving images (as appropriate) shown on the display device 904.

The various components of the electronic device 902 may be coupled together by one or more buses, which may include a power bus, a control signal bus, a status signal bus, a data bus, etc. For simplicity, the various buses are illustrated in FIG. 9 as a bus system 935. It should be noted that FIG. 9 illustrates only one possible configuration of an electronic device 902. Various other architectures and components may be utilized.

Figure 10:
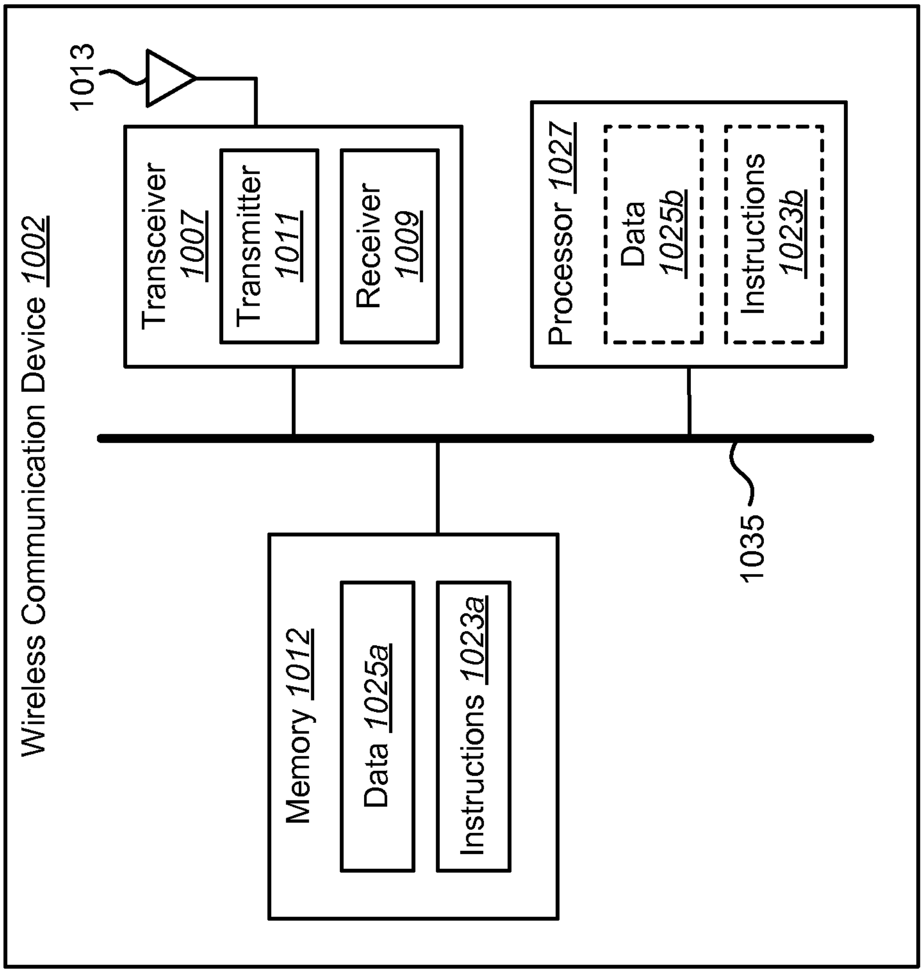
FIG. 10 illustrates certain components that may be included within a wireless communication device.

FIG. 10 illustrates certain components that may be included within a wireless communication device 1002. The wireless communication device 802 described in relation to FIG. 8 may be configured similarly to the wireless communication device 1002 that is shown in FIG. 10. The wireless communication device 1002 includes a processor 1027. The processor 1027 may be a general purpose single- or multi-chip microprocessor (e.g., an ARM), a special purpose microprocessor (e.g., a digital signal processor (DSP)), a microcontroller, a programmable gate array, etc. The processor 1027 may be referred to as a central processing unit (CPU). Although just a single processor 1027 is shown in the wireless communication device 1002 of FIG. 10, in an alternative configuration, a combination of processors (e.g., an ARM and DSP) could be used.

The wireless communication device 1002 also includes memory 1012 in electronic communication with the processor 1027 (e.g., the processor 1027 can read information from and/or write information to the memory 1012). The memory 1012 may be any electronic component capable of storing electronic information. The memory 1012 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1025*a* and instructions 1023*a* may be stored in the memory 1012. The instructions 1023*a* may include one or more programs, routines, sub-routines, functions, procedures, etc. The instructions 1023*a* may include a single computer-readable statement or many computer-readable statements. The instructions 1023*a* may be executable by the processor 1027 to implement the methods 200, 400, 600 that were described above. Executing the instructions 1023*a* may involve the use of the data 1025*a* that is stored in the memory 1012. FIG. 10 shows some instructions 1023*b* and data 1025*b* being loaded into the processor 1027.

The wireless communication device 1002 may also include a transmitter 1011 and a receiver 1009 to allow transmission and reception of signals between the wireless communication device 1002 and a remote location (e.g., a base station or other wireless communication device). The transmitter 1011 and receiver 1009 may be collectively referred to as a transceiver 1007. An antenna 1013 may be electrically coupled to the transceiver 1007. The wireless communication device 1002 may also include (not shown) multiple transmitters, multiple receivers, multiple transceivers and/or multiple antenna.

The various components of the wireless communication device 1002 may be coupled together by one or more buses, which may include a power bus, a control signal bus, a status signal bus, a data bus, etc. For simplicity, the various buses are illustrated in FIG. 10 as a bus system 1035.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An electronic device for detecting static images and reducing resource usage, comprising:
- a processor;
- memory in electronic communication with the processor;
- instructions stored in the memory, the instructions being executable to:
  - determine image memory;
  - set a timer;
  - monitor the image memory;
  - determine whether there is a write access request for the image memory;
  - determine whether an image change threshold is reached if there is a write access request;

determine whether a time threshold has been reached based on the timer if there is not a write access request for the image memory; and reduce display resource usage if the time threshold has been reached, wherein reducing display resource usage comprises reducing at least one display resource that is not image memory.

2. The electronic device of claim 1, wherein the instructions are further executable to reset the timer if there is a write access request for the image memory.

3. The electronic device of claim 1, wherein reducing display resource usage comprises one selected from the group consisting of reducing display contrast, reducing display brightness, reducing a display refresh rate, reducing clocking, reducing image processing, reducing decoding, adjusting bus priorities, adjusting bus speed, adjusting a display interface and adjusting a voltage.

4. The electronic device of claim 3, wherein the contrast is reduced based on an image dynamic range.

5. The electronic device of claim 1, wherein monitoring the image memory comprises monitoring addresses in the memory that are used for displaying one or more images on a display.

6. The electronic device of claim 1, wherein the image memory comprises one or more memory buffers in a display controller.

7. The electronic device of claim 1, wherein the instructions are further executable to adjust display resource usage if there is a write access request for the image memory after reducing display resource usage.

8. The electronic device of claim 1, further comprising a display.

9. The electronic device of claim 1, wherein the instructions are further executable to reduce image memory usage if the time threshold has been reached.

10. The electronic device of claim 1, wherein the instructions are further executable to, if there is a write access request for the image memory:

determine whether the time threshold has been reached based on the timer if the image change threshold has not been reached; and reduce display resource usage if the time threshold has been reached.

11. A method for detecting static images and reducing resource usage, comprising:

determining image memory on an electronic device;

setting a timer;

monitoring the image memory;

determining, on the electronic device, whether there is a write access request for the image memory;

determining whether an image change threshold is reached if there is a write access request;

determining whether a time threshold has been reached based on the timer if there is not a write access request for the image memory; and reducing, on the electronic device, display resource usage if the time threshold has been reached, wherein reducing display resource usage comprises reducing at least one display resource that is not image memory.

12. The method of claim 11, further comprising resetting the timer if there is a write access request for the image memory.

13. The method of claim 11, wherein reducing display resource usage comprises one selected from the group consisting of reducing display contrast, reducing display brightness, reducing a display refresh rate, reducing clocking, reducing image processing, reducing decoding, adjusting bus priorities, adjusting bus speed, adjusting a display interface and adjusting a voltage.

14. The method of claim 13, wherein the contrast is reduced based on an image dynamic range.

15. The method of claim 11, wherein monitoring the image memory comprises monitoring addresses in memory that are used for displaying one or more images on a display.

16. The method of claim 11, wherein the image memory comprises one or more memory buffers in a display controller.

17. The method of claim 11, further comprising adjusting display resource usage if there is a write access request for the image memory after reducing display resource usage.

18. The method of claim 11, wherein the electronic device comprises a display.

19. The method of claim 11, further comprising reducing image memory usage if the time threshold has been reached.

20. The method of claim 11, further comprising, if there is a write access request for the image memory:

determining whether the time threshold has been reached based on the timer if the image change threshold has not been reached; and reducing display resource usage if the time threshold has been reached.

21. A computer-program product for detecting static images and reducing resource usage, the computer-program product comprising a non-transitory tangible computer-readable medium having instructions thereon, the instructions comprising:

code for causing an electronic device to determine image memory;

code for causing the electronic device to set a timer;

code for causing the electronic device to monitor the image memory;

code for causing the electronic device to determine whether there is a write access request for the image memory;

code for causing the electronic device to determine whether an image change threshold is reached if there is a write access request;

code for causing the electronic device to determine whether a time threshold has been reached based on the timer if there is not a write access request for the image memory; and code for causing the electronic device to reduce display resource usage if the time threshold has been reached, wherein reducing display resource usage comprises reducing at least one display resource that is not image memory.

22. The computer-program product of claim 21, wherein reducing display resource usage comprises one selected from the group consisting of reducing display contrast, reducing display brightness, reducing a display refresh rate, reducing clocking, reducing image processing, reducing decoding, adjusting bus priorities, adjusting bus speed, adjusting a display interface and adjusting a voltage.

23. An apparatus for detecting static images and reducing resource usage, comprising:

means for determining image memory;

means for setting a timer;

means for monitoring the image memory;

means for determining whether there is a write access request for the image memory;

means for determining whether an image change threshold is reached if there is a write access request;

means for determining whether a time threshold has been reached based on the timer if there is not a write access request for the image memory; and means for reducing display resource usage if the time threshold has been reached, wherein reducing display resource usage comprises reducing at least one display resource that is not image memory.

24. The apparatus of claim 23, wherein reducing display resource usage comprises one selected from the group consisting of reducing display contrast, reducing display brightness, reducing a display refresh rate, reducing clocking, reducing image processing, reducing decoding, adjusting bus priorities, adjusting bus speed, adjusting a display interface and adjusting a voltage.

* * * * *